(12) United States Patent
Williams et al.

(10) Patent No.: US 10,628,527 B2
(45) Date of Patent: Apr. 21, 2020

(54) AUTOMATICALLY CROSS-LINKING APPLICATION PROGRAMMING INTERFACES

(71) Applicant: Microsoft Technology Licensing, LLC, Redmond, WA (US)

(72) Inventors: Kyle Mark Williams, Seattle, WA (US); Imed Zitouni, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 135 days.

(21) Appl. No.: 15/963,871

(22) Filed: Apr. 26, 2018

(65) Prior Publication Data

US 2019/0332667 A1 Oct. 31, 2019

(51) Int. Cl.
*G10L 15/22* (2006.01)
*G06F 17/00* (2019.01)
*G06F 17/27* (2006.01)
*G06N 20/00* (2019.01)
*G06F 16/332* (2019.01)
*G06F 16/901* (2019.01)

(52) U.S. Cl.
CPC ...... *G06F 17/2785* (2013.01); *G06F 16/3329* (2019.01); *G06F 16/9024* (2019.01); *G06N 20/00* (2019.01)

(58) Field of Classification Search
CPC .................................. G10L 15/22; G06F 17/00
See application file for complete search history.

(56) References Cited

U.S. PATENT DOCUMENTS

| | | | | |
|---|---|---|---|---|
| 8,082,337 B1 * | 12/2011 | Davis | .................. | H04L 41/0893 709/223 |
| 10,402,731 B1 * | 9/2019 | Cosic | ...................... | G06F 9/451 |
| 2007/0021955 A1 * | 1/2007 | Tolone | ................ | G06F 17/5004 703/22 |
| 2011/0179136 A1 * | 7/2011 | Twitchell, Jr. | ........ | H04L 45/586 709/217 |

\* cited by examiner

*Primary Examiner* — Shreyans A Patel
(74) *Attorney, Agent, or Firm* — Alleman Hall Creasman & Tuttle LLP

(57) ABSTRACT

A method for automatically cross-linking a plurality of APIs in an artificial intelligence (AI) graph structure comprises maintaining an AI graph structure defining a plurality of API-agnostic semantic entities, a plurality of function nodes, a plurality of input-adapter edges, and a plurality of output adapter edges. The method further comprises cross-linking a new function from a new API by computer-analyzing documentation of the new API with a natural language processing (NLP) machine in order to recognize the new function, and updating the AI graph data structure to include a new function node based on the new function.

20 Claims, 12 Drawing Sheets

FIG. 4A

```
API C quick reference                            401 version 1.2.3 function adjustedTime(tz) -> TimeInfo function cityName(str) -> (CoordData, TimeZoneInfo)

function getVersion() -> Integer function getDirections(dest, locCoord) -> MapInfo

```
API D version 0.6                                402
programming manual getSensorLoc() : GPS_INFO calibrate(GPS_INFO) : ()

getSensorRes() : float

...
```

US 10,628,527 B2

AUTOMATICALLY CROSS-LINKING APPLICATION PROGRAMMING INTERFACES

BACKGROUND

In order to perform tasks to assist a user, a computer system may execute one or more functions made available by various application programming interfaces (APIs). Performing a task to assist a user may include invoking a plurality of different APIs to execute functions from each of the different APIs. The various APIs may be numerous, and each of the various APIs may have different requirements.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for automatically cross-linking a plurality of APIs in an artificial intelligence (AI) graph structure comprises maintaining an AI graph structure defining a plurality of API-agnostic semantic entities, a plurality of function nodes, a plurality of input-adapter edges, and a plurality of output adapter edges. The method further comprises cross-linking a new function from a new API by computer-analyzing documentation of the new API with a natural language processing (NLP) machine in order to recognize the new function, and updating the AI graph data structure to include a new function node based on the new function as recognized by the NLP machine.

BRIEF DESCRIPTION OF THE DRAWINGS

FIGS. 4A and 4B show, for each of two example APIs, a simplified representation of API documentation.

DETAILED DESCRIPTION

In order to perform tasks to assist a user, a computer system may assess an intent of the user and execute one or more functions corresponding to the user's intent. On computing systems and/or on computer networks (e.g., the Internet), there may be various application programming interfaces (APIs), each of which may make available a plurality of different functions.

However, although the various APIs may provide functions configured to respond to aspects of the user's intent, the efficacy and/or efficiency of satisfying a user's query may be improved when functions from two or more of the various APIs are cooperatively used, e.g., with a particular flow of control and/or data defined by a suitable configuration of input parameters and/or output parameters of the functions made available by the various APIs. Furthermore, each of the various APIs may have different requirements (e.g., different programming languages, different programming conventions, names and documentation in different natural languages, or any requirements or implementation details which may vary among different APIs). Cooperatively using different functions from different ones of the various APIs may be a major hurdle to developing computer systems which perform tasks to assist a user, especially in response to natural language queries posed by a user. For example, due to the large number of possible configurations, it may not be practicable for human programmers to satisfactorily cross link different APIs for inter-API cooperation. Additionally, the different requirements of the various APIs may necessitate code to ensure compatibility between the APIs, which may complicate finding and implementing suitable cross-links.

Figure 1:
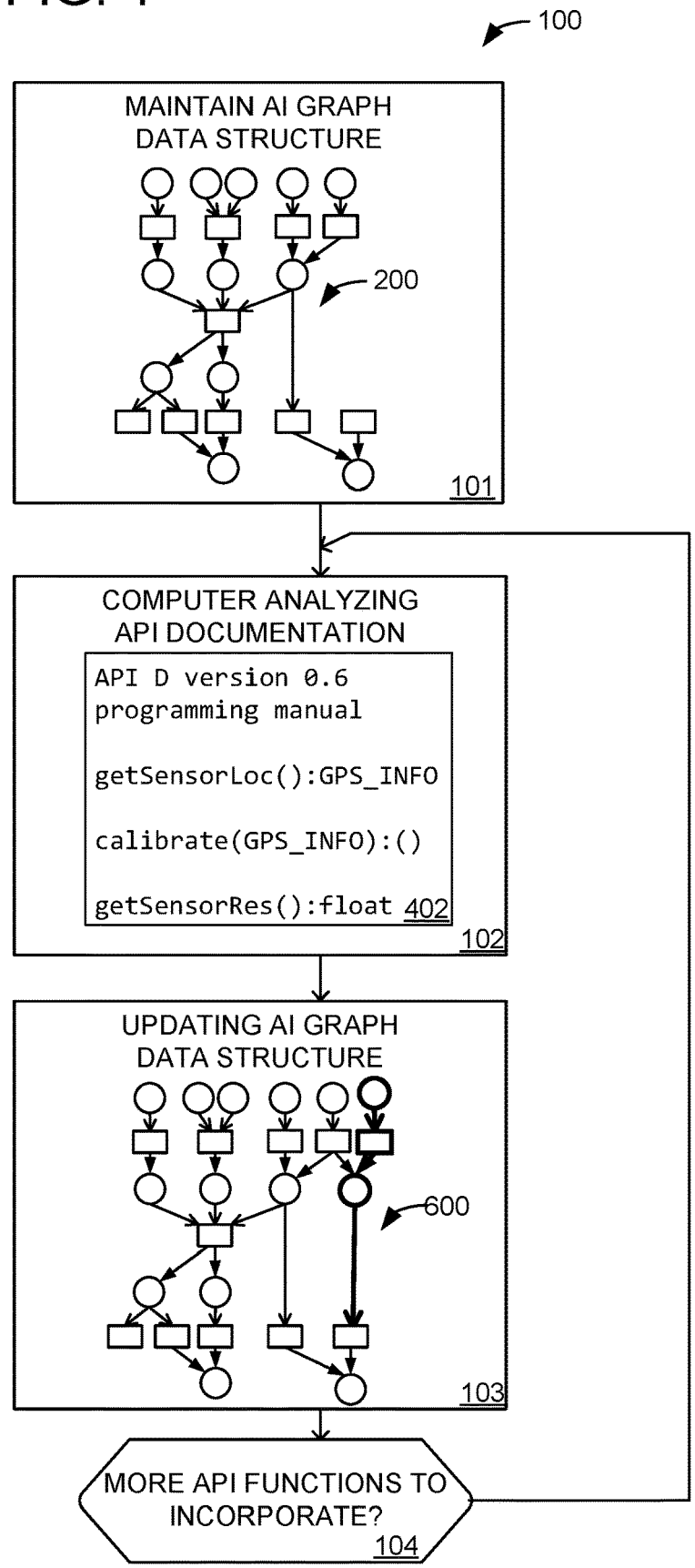
FIG. 1 shows a method for automatically cross-linking application programming interfaces (APIs).

FIG. 1 depicts a method 100 for automatically cross-linking a plurality of application programming interfaces (APIs) in an artificial intelligence (AI) graph data structure. At 101, method 100 includes maintaining an AI graph data structure, e.g., the AI graph data structure 200 depicted at 101. AI graph data structure 200 represents possible configurations of functions from the plurality of APIs.

An AI graph structure maintained according to method 100 enables the selection and execution of a target function from an API of the plurality of cross-linked APIs. The AI graph data structure cross-links various different APIs to support different dialog workflows to assist a user with a task. Dialog workflows may be constructed for a variety of different tasks, without needing to explicitly program each dialog workflow and without needing to write a large amount of code to ensure compatibility between the APIs. The AI graph data structure optionally may cross-link the plurality of APIs to small programs and/or computer services, hereinafter referred to as "botlets."

Method 100 may facilitate rapid and substantially automated development of dialog workflows to assist users in a variety of different tasks, using various functions made available by the plurality of APIs. Accordingly, method 100 may enable computer services to be automatically configured to better perform tasks to assist users (e.g., to perform a more diverse variety of tasks, to perform tasks more efficiently, and/or to improve user satisfaction with regard to the assistance provided by the computer system).

Figure 2A:
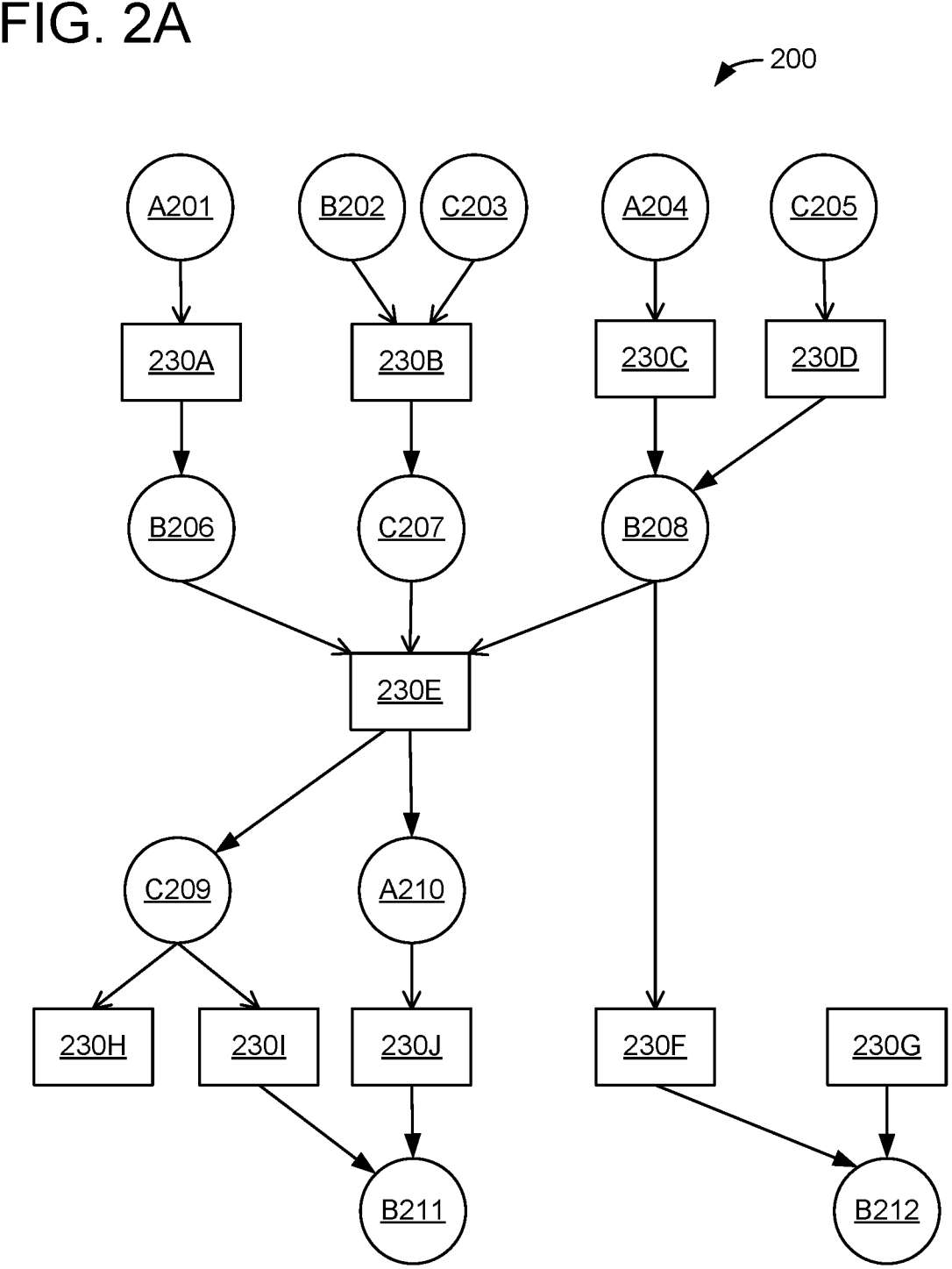
FIG. 2A shows an artificial intelligence (AI) graph data structure representing a plurality of cross-linked APIs.

FIG. 2A depicts the AI graph data structure 200 shown at 101 in more detail. AI graph data structure 200 defines a plurality of function nodes, wherein each function node represents a function made available by an API of the plurality of different APIs. Function nodes in AI graph data structure 200 are depicted as circles. Graph data structure 200 includes function nodes representing functions from three different APIs, API A, API B, and API C. Each function node represents a function made available by one of the plurality of APIs cross-linked in the AI graph data structure (e.g., API A, API B, or API C in AI graph data structure 200). Function nodes depicted in graph data structure 200 are labelled to indicate an API of origin with an alphabetic prefix, e.g., graph data structure 200 defines twelve function nodes 201-212, including function nodes A201, A204, and A210 from API A, function nodes B202, B206, B208, B211, and B212 from API B, and function nodes C203, C205, C207, and C209 from API C.

AI graph data structure 200 defines a plurality of API-agnostic semantic entities 230 (e.g., API-agnostic semantic entities 230A-230J), which are depicted as rectangles. Each API-agnostic semantic entity is associated with an API-agnostic data type delineating a class of data values that may be used to represent inputs and/or outputs of functions made available by the plurality of APIs. In some examples, an API-agnostic data type may delineate a specific collection and/or enumeration of valid data values (e.g., a name of a color from a predefined list of color names). In some examples, an API-agnostic data type may define a data format for valid data values (e.g., 32-bit signed integer format). In some examples, an API-agnostic data type may define a validation rule for valid data values (e.g., data values are well-formed uniform resource locator (URL) strings). More generally, an API-agnostic data type may delineate valid data values in any suitable manner, e.g., using a combination of enumerated data values, data format(s), and validation rules. An API-agnostic data type may define any suitable class of values at any level of granularity. Non-limiting examples of API-agnostic data types include: 1) calendar dates; 2) UNIX™ timestamps; 3) natural-language descriptions of weather (e.g., "mildly overcast"); 4) temperature/barometric pressure data; 5) city names; 6) geographic coordinates; 7) user login info; 8) audio data; 9) image data; and 10) map data.

Each API-agnostic data type represents data that may potentially be used or produced by any API of the plurality of APIs, e.g., an API-agnostic data type is not tied to any specific API. For example, when the plurality of APIs includes a first API configured to provide geolocation services and a second API also configured to provide geolocation services, the first API and the second API may each use and/or produce geographic coordinate data, wherein each API uses/produces geographic coordinate data values of an API-specific data type. Nevertheless, when the AI graph data structure includes an API-agnostic semantic entity associated with geographic coordinates, the API-agnostic semantic entity may be associated with an API-agnostic data type for geographic coordinates that is not tied to either of the first or second API. Accordingly, API-agnostic semantic entities may correspond to data that may be used/produced by one or more different APIs of the plurality of APIs, while abstracting away from API-specific details (e.g., API-specific data types).

AI graph data structure 200 cross-links the plurality of different APIs by cross-linking functions made available by each of the different APIs via connections to the API-agnostic semantic entities. Connections between function nodes and API-agnostic semantic entities are depicted as arrows. In particular, AI graph data structure 200 includes a plurality of input adapter edges connecting from API-agnostic semantic entities to function nodes, wherein each input adapter edge is depicted as an arrow with a solid head, e.g., a solid arrow connecting from API-agnostic semantic entity 230A to function node B206, and a solid arrow connecting from API-agnostic semantic entity 230B to function node C207. AI graph data structure 200 further includes a plurality of output adapter edges connecting from function nodes to API-agnostic semantic entities, wherein each output adapter edge is depicted as an arrow with a barbed head, e.g., a barbed arrow connecting from function node A201 to API-agnostic semantic entity 230A, and a barbed arrow connecting from function node B202 to API-agnostic semantic entity 230B.

Connections in AI graph structure 200 may represent possible configurations of data flow and/or control flow among the various API functions. For example, a first function node A201 representing a function from a first API A may be cross-linked to a second function node B206 representing a function from a second, different API B. Function node A201 is cross-linked to function node B206 via an output adapter edge connecting A201 to API-agnostic semantic entity 230A, and an input adapter edge connecting API-agnostic semantic entity 230A to function node B206. "Cross-linking" may be used herein to refer to any connection from a first function node to a second function node via an output adapter edge, API-agnostic semantic entity, and input adapter edge. According to the cross-linking, data values output by the first function may automatically be used as input data values for the second function. In particular, the API-agnostic semantic entity via which the two functions are cross-linked may represent a flow of data from the first function to the second function, so that the second function depends on an output parameter of the first function that may be expressed as a semantic data value of an API-agnostic semantic data type of the API-agnostic semantic entity.

An API-agnostic semantic entity may be referred to as "upstream" with regard to a function node if the API-agnostic semantic entity is connected to the function node via an input adapter edge. The upstream API-agnostic semantic entity may represent a possible source of data for parametrizing an API-specific input parameter of the function. Similarly, a function node may be referred to as upstream with regard to an API-agnostic semantic entity if the function node is connected via an output adapter edge to the API-agnostic semantic entity; accordingly, the API-agnostic semantic entity may be referred to as downstream with regard to the function node. In similar fashion, a first function node may be referred to as upstream and/or downstream with regard to a second function node. In FIG. 2A, semantic entities and function nodes are generally depicted at a vertical position denoting how far upstream they are, e.g., A201 is upstream to 230A and B206, and is depicted at a higher vertical position than 230A and B206, whereas A201 and B202 are depicted at the same vertical position as neither A201 or B202 is upstream with regard to the other.

An API-agnostic semantic entity may have zero, one, two, or any other number of incoming connections via output adapter edges from upstream function nodes. For example, API-agnostic semantic entity 230A has one incoming connection from function node A201, API-agnostic semantic entity 230B has two incoming connections from function nodes B202 and C203, and API-agnostic semantic entity 230G has no incoming connections. When an API-agnostic semantic entity has zero incoming connections from upstream function nodes, the API-agnostic semantic entity may be referred to herein as unavailable, e.g., because no function represented in the AI graph structure has an API-specific output parameter that may be expressed as a semantic data value of an API-agnostic semantic data type of the API-agnostic semantic entity. In contrast, when an API-agnostic semantic entity has one, two, or any greater number of incoming connections from upstream function nodes, it may be referred to herein as being available based on being provided by the upstream function nodes, e.g., because at least one function represented in the AI graph data structure is configured to produce an API-specific output parameter that may be expressed as a semantic data value of an API-agnostic semantic data type of the API-agnostic semantic entity.

A function made available by an API may have zero, one, two or any other number of API-specific input parameters. Accordingly, a function node in the AI graph data structure may have zero, one, two, or any other number of incoming connections from upstream API-agnostic semantic entities via input adapter edges. For example, function node B206 has one incoming connection from API-agnostic semantic entity 230A, function node B208 has two incoming connections from API-agnostic semantic entities 230C and 230D, and function node A201 has zero incoming connections. In general, a function may be executable, based on the cross-linking of APIs represented in the AI graph data structure, when all of the function's input parameters may be supplied. Accordingly, a function node may be referred to as satisfied when, for each API-specific input parameter of a function represented by the function node, the function node has an incoming connection from an upstream API-agnostic semantic entity corresponding to the API-specific input parameter, and when furthermore, each such upstream API-agnostic semantic entity is available, e.g., because the function may be executable by supplying input parameters based on the upstream API-agnostic semantic entities.

Although an API-agnostic semantic entity may be provided by one or more upstream function nodes, if any of the one or more upstream function nodes are unsatisfied, the API-agnostic semantic entity may not be available, since the upstream function nodes may not be executable.

An API-agnostic semantic entity may have zero, one, two, or any other number of outgoing connections via input adapter edges to downstream function nodes. For example, API-agnostic semantic entity 230A has one outgoing connection to function node B206, and API-agnostic semantic entity 230E has two outgoing connections to function nodes C209 and A210. An API-agnostic semantic entity may accordingly contribute to the satisfaction of one or more different function nodes, e.g., representing one or more different functions that may be executable by supplying input parameters based on the API-agnostic semantic entity.

A function may have zero, one, two, or more API-specific output parameters. Accordingly, a function node representing the function may have a corresponding number of outgoing connections to downstream API-agnostic semantic entities via output adapter edges. For example, function node C209 has two outgoing connections via output adapter edges to API-agnostic semantic entities 230H and 230I. Accordingly, each downstream API-agnostic semantic entity to which a function node is connected via output adapter edges may be made available by the function node.

Figure 2B:
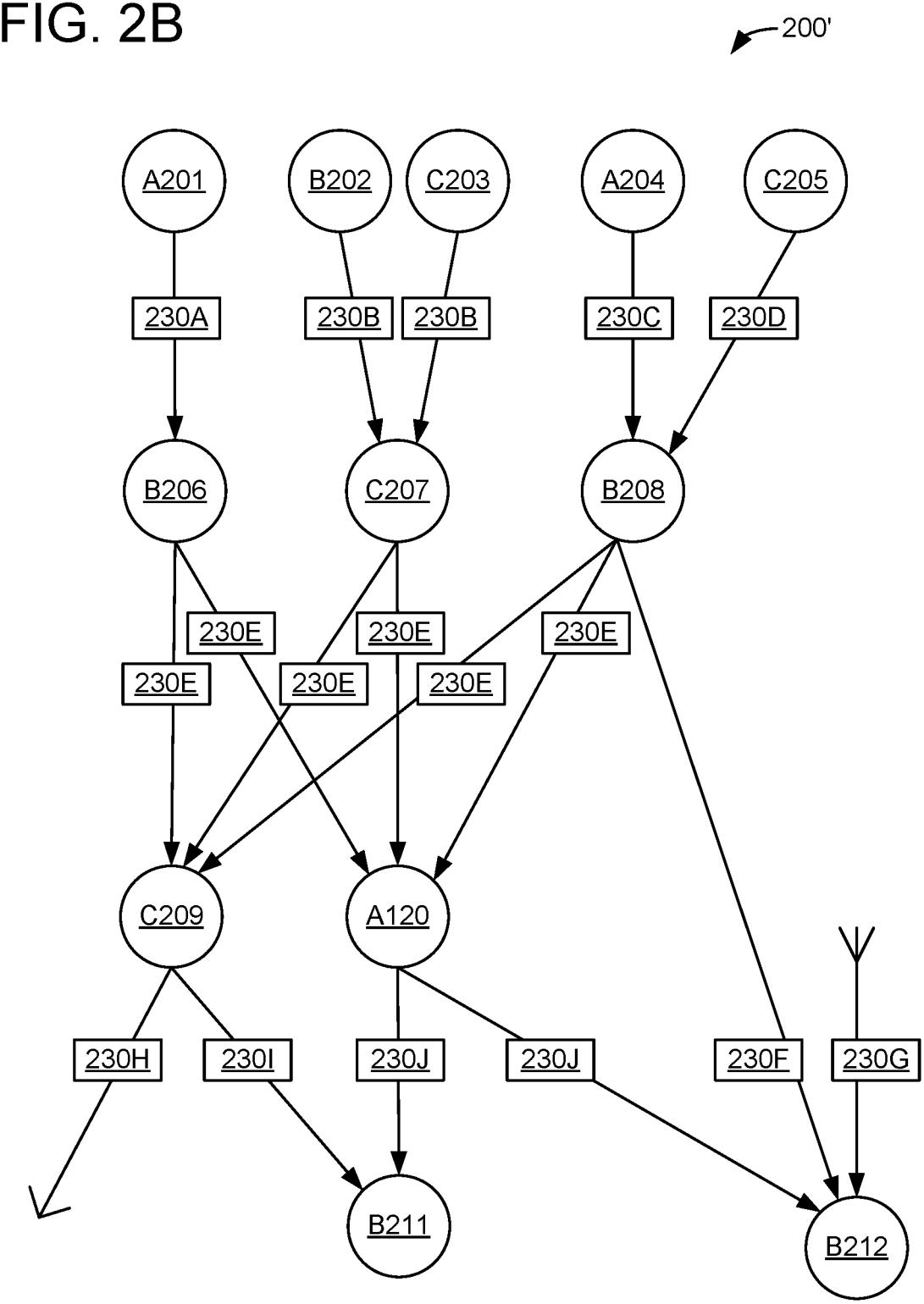
FIG. 2B shows an alternate representation of the AI graph data structure of FIG. 2A.

FIG. 2B shows an alternate depiction 200' of the graph data structure 200 of FIG. 2A. In particular, for a first function node and a second function node that are connected via an output adapter edge, API-agnostic semantic entity, and input adapter edge in graph data structure 200 of FIG. 2A, FIG. 2B shows the same connection with a different drawing convention in which the first function node and the second function node are connected via a single edge (i.e., the API-agnostic semantic entity is collapsed into the edges of FIG. 2B). For example, the connection between function node A201 and function node B206 is depicted in FIG. 2B as a collapsed edge denoting API-agnostic semantic entity 230A. In some cases, an API-agnostic semantic entity may be included in multiple such collapsed edges, e.g., API-agnostic semantic entity 230B is included in two different collapsed edges (from function node B201 to function node C206, and from function node B202 to function node C206), and API-agnostic semantic entity 230E is included in six different collapsed edges. In some cases, an input adapter edge, API-agnostic semantic entity, and output adapter edge may not connect to two different function nodes. For example, API-agnostic semantic entity 230H is connected to just one function node C208 via an output adapter edge, and API-agnostic semantic entity 230G is connected to just one function node B211 via an input adapter edge.

Returning briefly to FIG. 1, at 102, method 100 further includes, for a target API of a plurality of APIs, computer-analyzing documentation describing the target API in order to add one or more new functions made available by the target API. FIG. 1 at 102 depicts an example of API documentation 402 in a textual form, e.g., a computer-readable string describing the API.

"Computer-readable" may be used herein to refer to any encoding of API documentation suitable for programmatic manipulation, e.g., a plain-text encoding in any suitable binary format or a structured language for data interchange (e.g., extensible markup language (XML) or JavaScript™ object notation (JSON)). In some examples, API documentation in a structured language may delineate specific aspects and/or functions of the API with structure of the computer-readable string, e.g., by arranging functions made available by the API in an array or list expressed in JSON.

"Documentation" may be used herein to refer to any and all information provide in association with an API, e.g., API version info, function names, function input parameters and output parameters, usage examples, test cases, natural language descriptions of the API in general and functions of the API in particular, tutorials, specification of data types and/or binary data formats, and/or source code, comments, and developer documentation of an implementation of the API. Documentation may include $1^{st}$ party documentation provided by a service provider in association with an implementation of the API also provided by the same service provider, as well as $3^{rd}$ party documentation provided by a $3^{rd}$ party with regard to an API provided by a different party.

Figure 3:
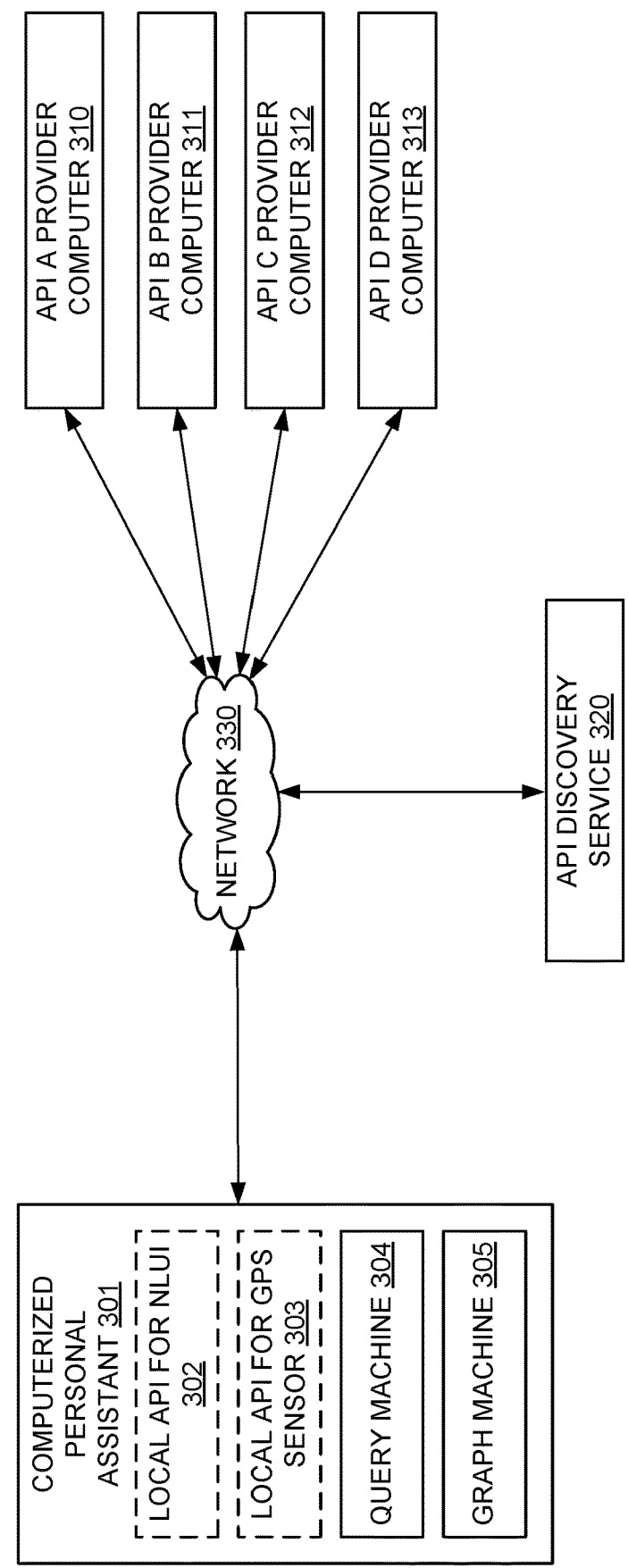
FIG. 3 shows an exemplary computing environment for enacting a method for automatically cross-linking APIs.

The plurality of APIs may include any APIs accessible within a computing environment in which method 100 is performed. For example, FIG. 3 depicts an exemplary computing environment 300 in which a plurality of different APIs are accessible. Computing environment 300 includes a computerized personal assistant 301. Although exemplary computing environment 300 is described with regard to computerized personal assistant 301, the methods described in the present disclosure (e.g., method 100) may be enacted on any suitable computing device, e.g., a personal computing device or a cloud service instantiated on one or more network-accessible computing devices. As used herein, computerized personal assistant 301 generally refers to a local and/or remote set of computing devices configured to maintain and/or update the AI graph data structure and/or answer queries using the AI graph data structure. In some examples, the computerized personal assistant 301 includes both 1) a local computing device that includes input devices (e.g., keyboard, microphone, camera) and output devices (e.g., display, speaker) for interacting with a user, and 2) a cooperating remote computer device (e.g., cloud computing device) configured to maintain and/or update the AI graph data structure and/or answer queries using the AI graph data structure.

Computerized personal assistant 301 includes a query machine 304 configured to determine an intent of a natural language query, e.g., a query received from a user or a computerized agent of the user while conducting a dialog with or for the user. For example, when present, local API 302 may be configured to receive queries for processing by query machine 304.

Computerized personal assistant 301 further includes a graph machine 305 configured to access an AI graph data structure (e.g., AI graph data structure 200 as described above with regard to FIG. 2A). For example, graph machine 305 may be configured to cross-link a plurality of APIs according to method 100. Graph machine 305 may additionally or alternately be configured to execute one or more functions of the plurality of APIs, as will be described in detail below with reference to FIGS. 8 and 9A-9E.

Computerized personal assistant 301 is optionally configured to invoke a plurality of local APIs that make available functions for execution on computerized personal assistant 301. For example, computerized personal assistant 301 may include a local API 302 for a native language user interface (NLUI), and a local API 303 for a GPS sensor (e.g., when computerized personal assistant 301 is implemented as a mobile device including a GPS sensor). In some examples, local API 302 may be configured to utilize a microphone and/or speaker of computerized personal assistant 301 to conduct a dialog with a user, e.g., according to a dialog workflow defined in the context of an AI graph data structure according to the present disclosure. In some examples, local API 303 may be configured to determine a GPS coordinate representing a location of computerized personal assistant 301. In other examples, computerized personal assistant 301 may include further local APIs, e.g., for capturing data via sensor devices of computerized personal assistant 301, or for visually presenting data via a display of computerized personal assistant 301.

Computing environment 300 further includes a computer network 330, which may be any suitable computer network (e.g., the Internet). Computerized personal assistant 301 may be communicatively coupled via computer network 330 to an API discovery service 320. API discovery service 320 is configured to track, on computer network 330, a plurality of available APIs accessible via computer network 330. API discovery service 320 is further configured to provide, for each available API, documentation describing the API in a computer-readable format. Accordingly, computerized personal assistant 301 is configured to receive documentation describing each different target API of the plurality of APIs from API discovery service 320. For example, API discovery service 320 is communicatively coupled to a plurality of API provider computers, e.g., API A provider computer 310 configured to make available functions of API A, API B provider computer 311 configured to make available functions of API B, API C provider computer 312 configured to make available functions of API C, and API D provider computer 313 configured to make available functions of API D. Accordingly, API discovery service 320 tracks APIs A, B, C, and D and provides, to computerized personal assistant 301, documentation of APIs A, B, C, and D. Although FIG. 3 depicts four different API providers, API discovery service 320 may be configured to track 10s, 100s, 1000s, or more APIs accessible via network 330.

Although API discovery service 320 may provide documentation of the plurality of APIs to computerized personal assistant 301, in some examples, computerized personal assistant 301 may nevertheless be configured to track some or all of the plurality of APIs independently from API discovery service 320. For example, in some cases, API discovery service 320 may provide only partial, and/or out-of-date information for a subset of APIs tracked by API discovery service 320; accordingly, computerized personal assistant 301 may independently track the subset of APIs.

The plurality of APIs may include the local APIs of computerized personal assistant 301 (e.g., local APIs 302 and 303). In some examples, one or more local APIs of computerized personal assistant 301 may not be tracked by API discovery service 320, e.g., for proprietary and/or device specific local APIs. Accordingly, computerized personal assistant 301 may independently track such local APIs. In other examples, API discovery service 320 may track local APIs. For example, in order to facilitate implementation of a computerized personal assistant including various physical hardware devices, API discovery service 320 may track various local APIs for the various physical hardware devices. In an example, computerized personal assistant 301 may interchangeably include a first GPS device or a second GPS device; accordingly, API discovery service 320 may track two different versions of local API 303 configured to alternately utilize either the first GPS device or the second GPS device.

FIG. 4A shows a first example of API documentation 401 for API C. FIG. 4B shows a second example of API documentation 402 for a new API D not yet cross-linked with the other APIs in the graph data structure 200. For example, API documentation 401 and 402 may be received at computerized personal assistant 301 from API discovery service computer 320 as shown in FIG. 3.

API documentation 401 includes at least four functions, named "adjustedTime," "cityName," "getVersion," and "getDirections." All four such functions are described similarly in API documentation 401, e.g., according to a pattern where a function name occurs after a keyword, "function." API documentation 401 describes API-specific input parameters and output parameters of each function in association with the function names, e.g., function "adjustedTime" may be parametrized by an input parameter "tz" and returns an output parameter indicated by an identifier "TimeInfo," as denoted by the parentheses and plaintext "arrow" ("→") symbol. In some cases, a function may not be parametrized by any API-specific input parameter, e.g., function "getVersion" is not parametrized by any input parameter.

Although API documentation 401 delineates API-specific input parameters and API-specific output parameters by parentheses and plaintext arrows, other API documentation examples (e.g., API documentation example 402) may describe API-specific input parameters and API-specific output parameters in any suitable manner. For example, API documentation 402 does not use a keyword (e.g., "function") to delineate each function, and separates API-specific input parameters from API-specific output parameters with a colon (":") instead of a textual arrow.

Although API documentation 401 and 402 are short examples indicating only a brief description of the API, names of functions, and names of API-specific input/output parameters of the functions, API documentation suitable for processing according to method 100 may be highly variable for different APIs of the plurality of APIs. For example, different APIs may vary in terms of format, accuracy, and completeness with regard to any feature of API description (e.g., API version info, function names, function input parameters and output parameters, usage examples, test cases, natural language descriptions of the API in general and functions of the API in particular, tutorials, specification of data types and/or binary data formats, and/or source code, comments, and developer documentation of an implementation of the API).

Returning briefly to FIG. 1, after receiving API documentation for a target API, computer-analyzing the API documentation 402 at 102 includes operating a natural language processing (NLP) machine, wherein the NLP machine is previously trained to recognize natural language features of API documentation (e.g., natural language features describing functions, API-specific data types, input parameters, and/or output parameters). In some examples, the NLP machine trained to recognize natural language features of API documentation, and the natural language query machine 304 described above with regard to computerized personal assistant 301 may be implemented as a single NLP machine configured to process documentation in addition to queries. In other examples, natural language query machine 304 and the NLP machine described herein may be separate machines.

Computer-analyzing API documentation 402 with an NLP machine includes identifying a new function made available by the target API, e.g., by computer-identifying a natural language feature indicating the new function such as function name "getSensorLoc." For example, the NLP machine may be previously trained to recognize a pattern in which an API-specific input parameter of a function is enclosed in parentheses following a name of the function, as in API documentation 401 and 402. In some examples, the NLP machine may be able to recognize general patterns, e.g., an API-specific output parameter of a function follows the parentheses containing the API-specific input parameters, separated by one or more additional punctuation marks. Accordingly, the NLP machine may be able to robustly recognize functions.

Furthermore, the NLP machine may be able to recognize API-specific input/output parameters of each function. Accordingly, computer-analyzing documentation 402 with the NLP machine may include computer-identifying a natural language feature indicating an API-specific input parameter of the new function, and/or computer-identifying a natural language feature indicating an API-specific output parameter of the new function. For example, the "getSensorLoc" function has an API-specific output parameter indicated by the identifier "GPS_INFO." The "getSensorLoc" function is indicated to not require any API-specific input parameter (e.g., with empty parentheses indicating a "void" parameter requiring no specific data).

Computer-analyzing API documentation 402 with the NLP machine further includes identifying an upstream API-agnostic semantic entity based on the natural language feature, e.g., an API-agnostic semantic entity corresponding to an API-specific input parameter of the function. For example, the NLP machine may be previously trained to recognize an association between natural language naming conventions of function names, input parameters, and/or output parameters in order to identify the upstream API-agnostic semantic entity. In some examples, identifiers may indicate parameter names. In some examples, identifiers may indicate API-specific data types associated with parameters. For example, the identifiers "GPS_INFO" and "float" may indicate API-specific data types of API-specific input/output parameters described in API documentation 402.

API documentation may include various descriptive identifiers (e.g., chosen by human programmers to describe intended semantics of an API-specific input/output parameter or a function). For example, an API may use various identifiers to describe a GPS location data type. In API documentation 401 and 402, identifiers such as "GPS_INFO", "locCoord", "CoordData," or "loc" may all refer to parameters having GPS location data types. Accordingly, the NLP machine may be configured to recognize natural language features that may indicate an API-agnostic semantic entity and/or API-agnostic semantic data type associated with an API-specific input and/or output parameter.

Computer-analyzing API documentation 402 with the NLP machine further includes identifying a downstream API-agnostic semantic entity corresponding to an API-specific output parameter of the function. Accordingly, the NLP machine may recognize a natural language feature indicating an API-specific output parameter of the new function, and computer-identify the downstream API-agnostic semantic entity based on the natural language feature associated with the API-specific output parameter (e.g., similarly as described above with regard to computer-identifying the upstream API-agnostic semantic entity based on the natural language feature associated with the API-specific input parameter). For example, when identifiers such as "GPS_INFO" and "locCoord" are each associated with GPS location data types, the NLP machine may identify a common API-agnostic semantic entity corresponding to parameters described in terms of "GPS_INFO" and "locCoord," e.g., corresponding to an input parameter of the "getDirections" function shown in API documentation 401 and/or corresponding to an output parameter of the "getSensorLoc" function shown in API documentation 402.

In some examples, computer-identifying an API-agnostic semantic entity may include selecting a previously defined API-agnostic semantic entity from a plurality of predefined API-agnostic semantic entities. In other examples, computer-identifying the API-agnostic semantic entity may include computer-identifying a new API-agnostic semantic entity based on associated natural language features. For example, a new API-agnostic semantic entity may be associated with an API-agnostic semantic data type that is a composite data type of other API-agnostic semantic data types (e.g., a pair or tuple of other API-agnostic semantic data types), based on recognizing a description of the composite data type included in the API documentation.

The NLP machine may be previously trained via any suitable combination of supervised, semi-supervised, and/or unsupervised learning techniques. In some examples, the NLP machine may be previously trained via supervised and/or semi-supervised learning on a plurality of labelled APIs, wherein a labelled API includes documentation describing an API annotated by one or more trainers to include one or more semantic labels, wherein a semantic label indicates an API-specific parameter of the API and an API-agnostic semantic entity corresponding to the API-specific parameter.

In some examples, such training may employ zero-shot and/or few-shot learning techniques, wherein the NLP machine is trained to recognize one or more natural language features of API documentation (e.g., input parameters) based on zero or a small number (e.g., fewer than 10, or fewer than 100) labelled examples. In an example, zero-shot learning may be employed to recognize a natural language feature that shows up rarely in available API documentation, e.g., a domain-specific parameter name occurring in only a small number of APIs, or a programming-language-specific syntax for input parameters occurring in only a small number of APIs. In some examples, the zero-shot and/or few-shot learning techniques may include data augmentation, e.g., automatically generating new labelled data based on available labelled data, without requiring the one or more trainers to provide more semantic labels. For example, data augmentation may include "fuzzing" available labelled data to add noise content to the data, e.g., by changing spellings of parameter names. In some examples, zero-shot and/or few-shot learning techniques may include generative adversarial networks (GAN) or other adversarial methods, e.g., wherein training the NLP model includes training a discriminator model to recognize natural language features and training a generator model to generate new examples of natural language features for use in training the discriminator model.

In some examples, the NLP machine may be trained using unsupervised learning techniques, alternately or additionally to using supervised and/or semi-supervised learning techniques. In an example wherein the NLP machine is trained using supervised and/or supervised learning techniques, such training may include preprocessing and/or augmenting data with one or more unsupervised learning techniques, in order to employ supervised and/or semi-supervised learning techniques using the preprocessed and/or augmented data. For example, preprocessing the data may reducing a dimensionality of the data (e.g., using principal component analysis, self-organizing maps, topological data analysis, or any other suitable dimensionality reduction technique). For example, augmenting the data may include clustering labelled and/or unlabeled data (e.g., using nearest neighbor search, k-means clustering or any other suitable clustering technique(s)). Such clustering may process labelled data and unlabeled data, in order to determine, for each unlabeled datum, a cluster including the unlabeled datum and a labelled datum, and to infer a label for the unlabeled datum based on the label of the labelled datum. In some examples, training the NLP machine may employ any other suitable unsupervised learning technique(s), e.g., nearest neighbor search, autoencoders (e.g., deep variational autoencoders), belief networks (e.g., deep belief networks), matrix and/or tensor factorization techniques, and/or expectation maximization techniques.

The NLP machine may employ any suitable combination of machine learning techniques. For example, the NLP machine may include a language embedding model configured to output, for a word and/or phrase from documentation of an API, a computer-readable representation of the word and/or phrase.

The NLP machine may be operated in cooperation with an AI machine previously trained to associate natural language features with API-agnostic semantic entities, in order to output, for a natural language feature from API documentation, a classification indicating an API-agnostic semantic entity associated with the natural language feature. In some examples, the AI machine may be a neural network (e.g., a multi-layer neural network, a recurrent neural network such as long short-term memory, or a temporal convolutional neural network) configured to receive one or more of the computer-readable representations.

The NLP machine and/or the AI machine (e.g., the word embedding model and/or the neural network) may include a plurality of trainable parameters, wherein functionality of the NLP machine and the AI machine is determined by the plurality of trainable parameters. The NLP machine and the AI machine may be trainable by adjusting the plurality of trainable parameters, e.g., via gradient descent or any other suitable optimization method (e.g., conjugate gradient methods). The present disclosure is not intended to disclose new NLP techniques or new AI techniques, but instead, the methods performed herein may be implemented using any suitable arrangement of state of the art and/or future NLP techniques and AI techniques.

The NLP machine and the AI machine may be trained cooperatively, e.g., training the NLP machine and AI machine may include operating the NLP machine to computer-identify a natural language feature, operating the AI machine to classify the natural language feature, and comparing the classification output with a semantic label from the labelled API documentation, in order to adjust the plurality of trainable parameters so that the AI machine more accurately classifies natural language features computer-identified by the NLP machine. By training in this manner on a plurality of labelled APIs, the NLP machine and AI machine may be able to robustly computer-analyze a larger plurality of APIs including APIs that were not annotated by the one or more trainers. It is believed that training on a relatively small plurality of labelled APIs (e.g., 10s or 100s of APIs) may enable the NLP machine and AI machine to robustly classify natural language features from a substantially larger plurality of APIs (e.g., 1000s or even more APIs).

Figure 5B:
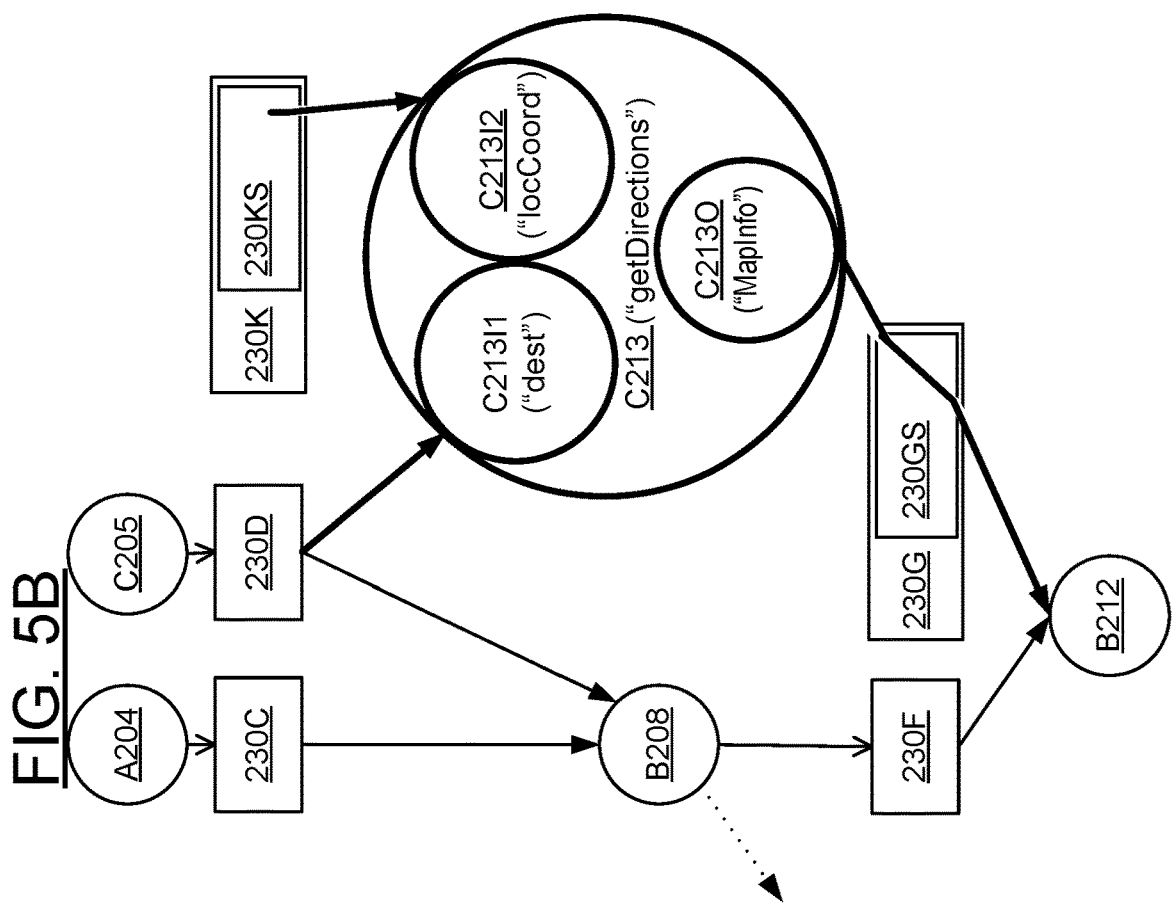
FIGS. 5A-5C show an example of automatically updating an AI graph data structure to cross-link a first function from a first API to a second function from a second, different API.
Figure 5A:
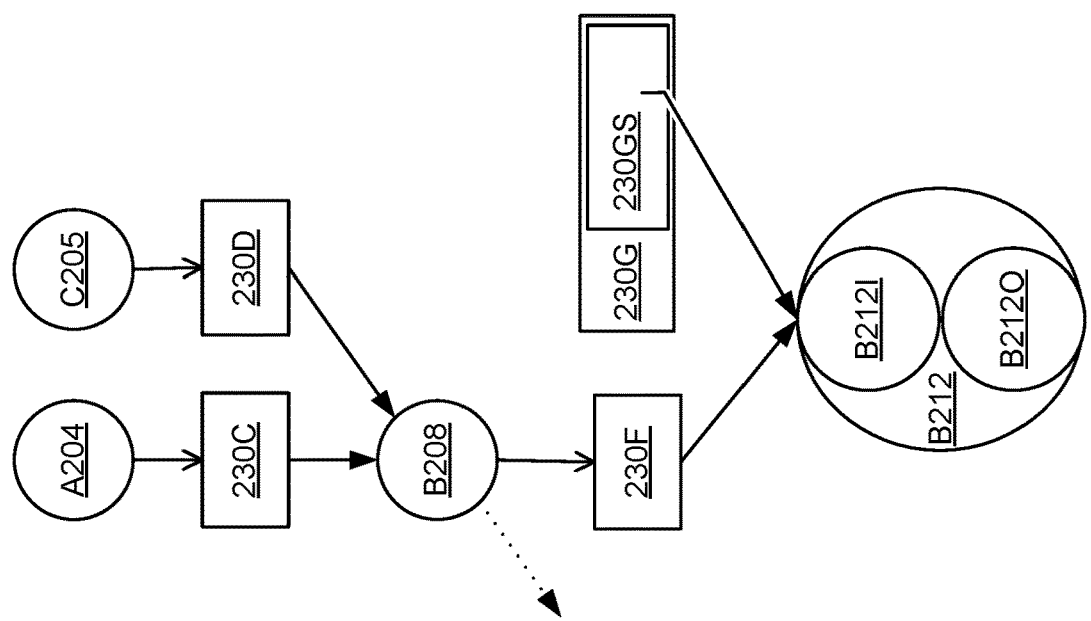
Figure 5C:
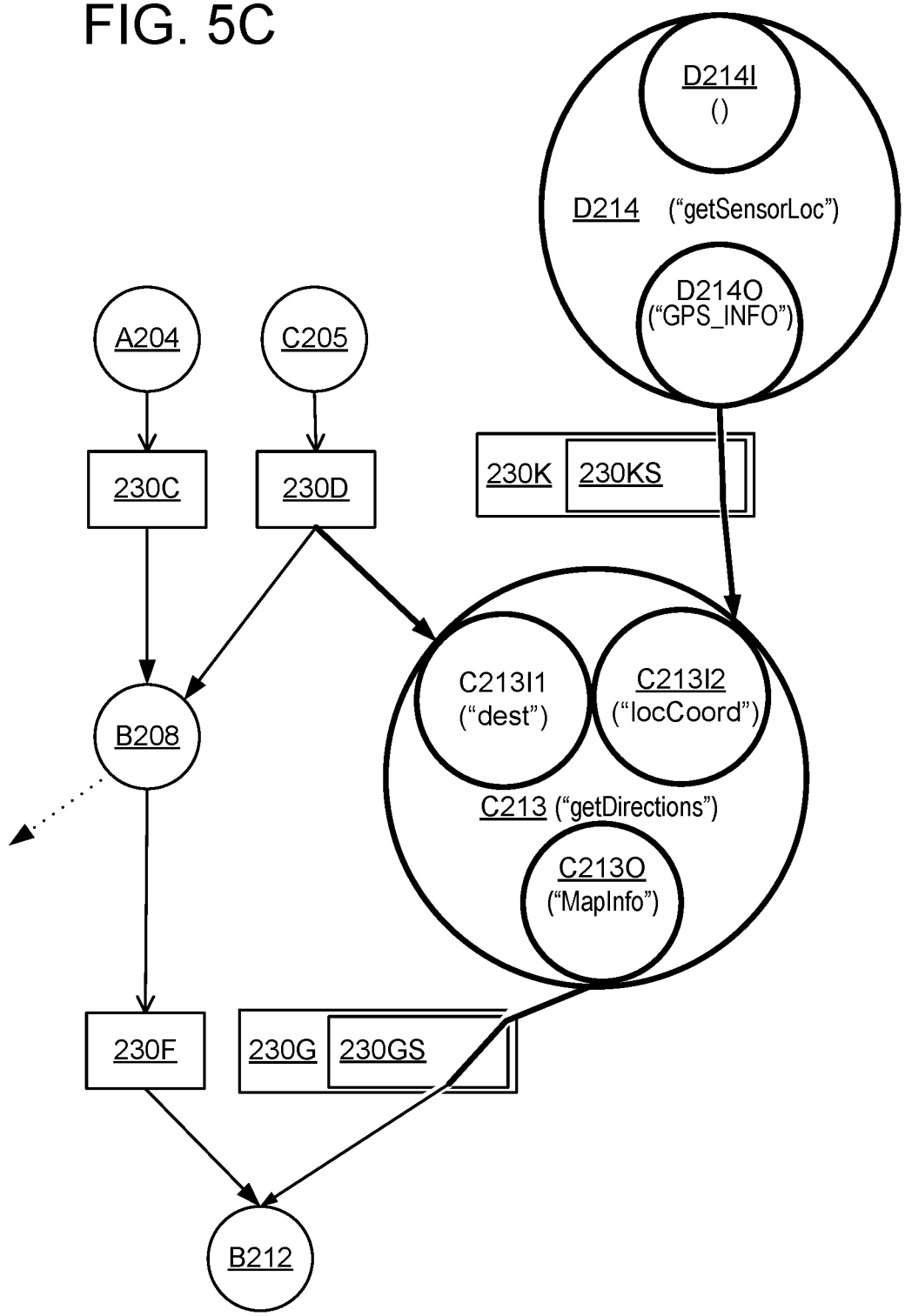

FIG. 5A shows a portion of the graph data structure 200 previously shown in FIG. 2A, focusing on a function node B212 which is unsatisfied (e.g., because API-agnostic semantic entity 230G is unavailable, since no function node is connected to API-agnostic semantic entity 230G via an output adapter edge). In FIGS. 5A-5C, an output adapter edge of function node B208 is connected to an API-agnostic semantic entity not shown in the graph and is shown with a dotted-line arrow.

FIG. 5A depicts API-agnostic semantic entity 230G in an expanded format, showing that API-agnostic semantic entity 230G includes a semantic data socket 230GS configured to hold a semantic data value having an API-agnostic semantic data type associated with the API-agnostic semantic entity.

FIG. 5A depicts function node B212 in an expanded format, showing that function node B212 includes an input socket B2121 configured to receive input data values of an API-specific input data type. Although not depicted in FIG. 5A, each other function node in the AI graph data structure may similarly include one or more input data sockets. An input data socket of a function node may correspond to an API-specific input parameter of a function represented by the function node.

FIG. 5B shows the portion of the graph structure shown in FIG. 5A, updated to include an additional function node C213 representing a function "getDirections" from API C (e.g., as shown in API documentation 401 of FIG. 4A), based on computer-analyzing API documentation 401. New additions to the graph data structure are shown in bolded lines. Updating the AI graph data structure to include new function node C213 includes computer-analyzing API documentation 401 describing API C, with the NLP machine previously trained to identify natural language features associated with APIs. Computer-analyzing API documentation 401 includes operating the NLP machine to identify a function made available by the API C, e.g., "getDirections." Computer-analyzing API documentation 401 further includes identifying one or more natural language features associated with API-specific input parameters of the function. In an example, natural language features associated with a API-specific input parameters of the function include the identifiers, "dest" (e.g., denoting a destination address for getting directions from a map service provided by API C) and "locCoord" (e.g., for denoting a start location for the directions).

Computer-analyzing the documentation further includes computer-recognizing, with an artificial intelligence (AI) machine previously trained to associate natural language features with API-agnostic semantic entities (e.g., the AI machine described above), an API-agnostic semantic entity associated with the natural language feature. For example, the AI machine may recognize that an upstream API-agnostic semantic entity 230K is associated with the "locCoord" identifier, e.g., when semantic entity 230K is a semantic entity for location data. Accordingly, based on recognizing such association, the AI graph data structure may be updated to include a new function node representing the "getDirections" function.

The AI graph data structure may additionally be updated to include an input adapter edge. For example, API-specific input data socket C21311 corresponds to a first parameter "dest" of function "getDirections" defined in API 401. Similarly, API-specific input data socket C21312 corresponds to a second parameter "locCoord" of function "getDirections." Based on recognizing the association between API-agnostic semantic entity 230K and the "locCoord" identifier, upstream API-agnostic semantic entity 230K may be connected via an input adapter edge to the input data socket C21312 corresponding to the "locCoord" identifier.

Although input sockets and semantic data sockets are not shown in detail in FIGS. 2A and 5A-5C, each input adapter edge of the plurality of input adapter edges of the AI graph data structure connects a semantic data socket of an API-agnostic semantic entity to an input data socket of a function node in a similar fashion. Accordingly, based on recognizing the association between API-specific input parameter "dest" and the corresponding upstream API-agnostic semantic entity 230D, semantic entity 230D may be connected via an input adapter edge to the input data socket C21311 corresponding to the "dest" identifier.

As depicted in FIG. 5B, function node B212 is unsatisfied, because although API-agnostic semantic entity 230G would be available if new function node C213 were satisfied, new function node C213 is unsatisfied as API-agnostic semantic entity 230K is not yet available.

Each function node further includes an output data socket (e.g., output data socket C2130 of function node C213 as shown in FIG. 5B and output data socket B2120 of function node B212 as shown in FIG. 5A). An output socket of a function node may correspond to an API-specific output parameter of a function represented by the function node, e.g., output data socket C2130 corresponds to API-specific output parameter "MapInfo" of function C213 of API 401. Each output adapter edge of the plurality of output adapter edges of the AI graph data structure connects an output data socket of a function node to a semantic data socket of an API-agnostic semantic entity.

Based on the incoming connections from upstream API-agnostic semantic entities, the "getDirections" function represented by function node C213 may be executable by parametrizing API-specific input parameter "dest" based on semantic data associated with upstream API-agnostic semantic entity 230D and parametrizing API-specific input parameter "locCoord" based on semantic data associated with upstream API-agnostic semantic entity 230K. Accordingly, input data socket 21311 of node C213 may be configured to receive an input data value from a semantic data socket of upstream API-agnostic semantic entity 230D, and input data socket 21312 of node C213 may be configured to receive an input data value from a semantic data socket of upstream API-agnostic semantic entity 230K (e.g., from semantic data socket 230KS).

The input adapter edge between the semantic data socket 230KS of the upstream API-agnostic semantic entity 230K and the input data socket C21311 of the new function node C213 may be configured to ensure compatibility between an API-agnostic semantic data type associated with the upstream API-agnostic semantic entity 230K and the API-specific input data type of the API-specific input parameter "locCoord". For example, ensuring compatibility may include translating semantic data in an API-agnostic semantic data type into input data of an API-specific data type. In some examples, an API-agnostic semantic data type and an API-specific data type of an associated API-specific input parameter may be defined according to a shared format, and accordingly, ensuring compatibility may not require any translation of semantic data. For example, an API-agnostic semantic data type may include semantic data values in a structured language for data interchange (e.g., JSON), while an API uses API-specific parameters represented in the same structured language.

FIG. 5C shows the portion of AI graph data structure 200 from FIG. 5B, further updated to include a new function node from a different API of the plurality of APIs, namely a function node D214 representing function "getSensorLoc" of API D based on API documentation 402. In FIG. 5C, the AI graph data structure is configured so that API-agnostic semantic entity 230G is available, e.g., because function node C213 is satisfied as function "getDirections" may be parametrized based on semantic data values provided by semantic entities 230D and 230K, which are in turn available. Accordingly, function node B212 is satisfied.

By automatically cross-linking new functions from APIs C and D, the AI graph data structure may enable executing a function from a different API, e.g., e.g., a function from API B represented by function node B212 automatically, based on parametrizing the function with input data derived from results of executing functions from APIs A, B, C, and D, in cooperation. For example, function node B212 may represent a function to display a map based in part on an API-agnostic semantic entity 230G associated with map info, and accordingly "getDirections" may be executed to output a map info data value for transmitting to semantic entity 230G, so that semantic entity 230G may provide an API-agnostic semantic data value representing the map info to the function to display the map.

Updating the AI graph data structure to cross-link API D includes computer-analyzing API documentation 402 describing API D with the NLP machine previously trained to identify natural language features associated with APIs. Accordingly, computer-analyzing API documentation 402 may include operating the NLP machine to identify a function made available by the API D, e.g., "getSensorLoc." Computer-analyzing API documentation 402 may further include identifying a natural language feature associated with an API-specific output parameter of the function, e.g., the "GPS_INFO" identifier. In some examples, computer-analyzing the documentation may further include computer-recognizing, with the AI machine, an association between the natural language feature "GPS_INFO" and an API-agnostic semantic entity previously identified for a different API, e.g., semantic entity 230K for which an association to GPS coordinate data was previously recognized. Accordingly, updating the AI graph structure includes adding an output adapter edge connecting an output data socket D2140 of the new function node to a semantic data socket 230KS of the downstream API-agnostic semantic entity 230K. For example, FIG. 5C shows an output adapter edge connecting from output data socket D2140 of new function node D214 to semantic data socket 230KS of API-agnostic semantic entity 230K. Function "getSensorLoc" is indicated to not receive an input parameter, so function node D214 is satisfied as function "getSensorLoc" may be executed without supplying any input parameter.

Output data socket D2140 of the function node D214 may be configured to transmit an output data value of the "getSensorLoc" function, the output data value having an API-specific output data type associated with the "GPS_INFO" API-specific output parameter. The output adapter edge between the output data socket D2140 of function node D214 and semantic data socket 230KS of downstream API-agnostic semantic entity 230K may be configured to ensure compatibility between the API-specific output data type of the API-specific output parameter "GPS_INFO" and an API-agnostic semantic data type associated with the downstream API-agnostic semantic entity 230K, e.g., by translating between data formats when necessary, similarly to the input adapter edge ensuring compatibility between the semantic data socket 230KS and the input adapter edge connecting to the input data socket C21312 of new function node C213 as described above.

Returning briefly to FIG. 1, method 100 includes, at 103, updating the AI graph data structure to include new functions from the plurality of APIs. For example, 102 shows a AI graph data structure 600 resulting from updating the AI graph data structure 200. New additions to the AI graph data structure, shown in bolded lines, include two new function nodes connected via input/output adapter edges to a new API-agnostic semantic entity. The updated AI graph data structure 600 is shown in more detail in FIG. 6. AI graph data structure 600 includes all of the function nodes, semantic entities, input adapter edges, and output adapter edges of AI graph data structure 200. AI graph data structure 600 further includes new function node C213 representing the "getDirections" function from API C and second new function node D214 representing the "getSensorLoc" function from API D, along with API-agnostic semantic entity 230K representing possible data flow between "getSensorLoc" and "getDirections" (e.g., possible parametrization of the "locCoord" input parameter of the "getDirections" function based on the "GPS_INFO" output parameter of the "getSensorLoc" function, such data flow intermediated by the input/output adapter edges connecting to semantic data socket 230KS based on the API-agnostic data type of API-agnostic semantic entity 230K).

Figure 6:
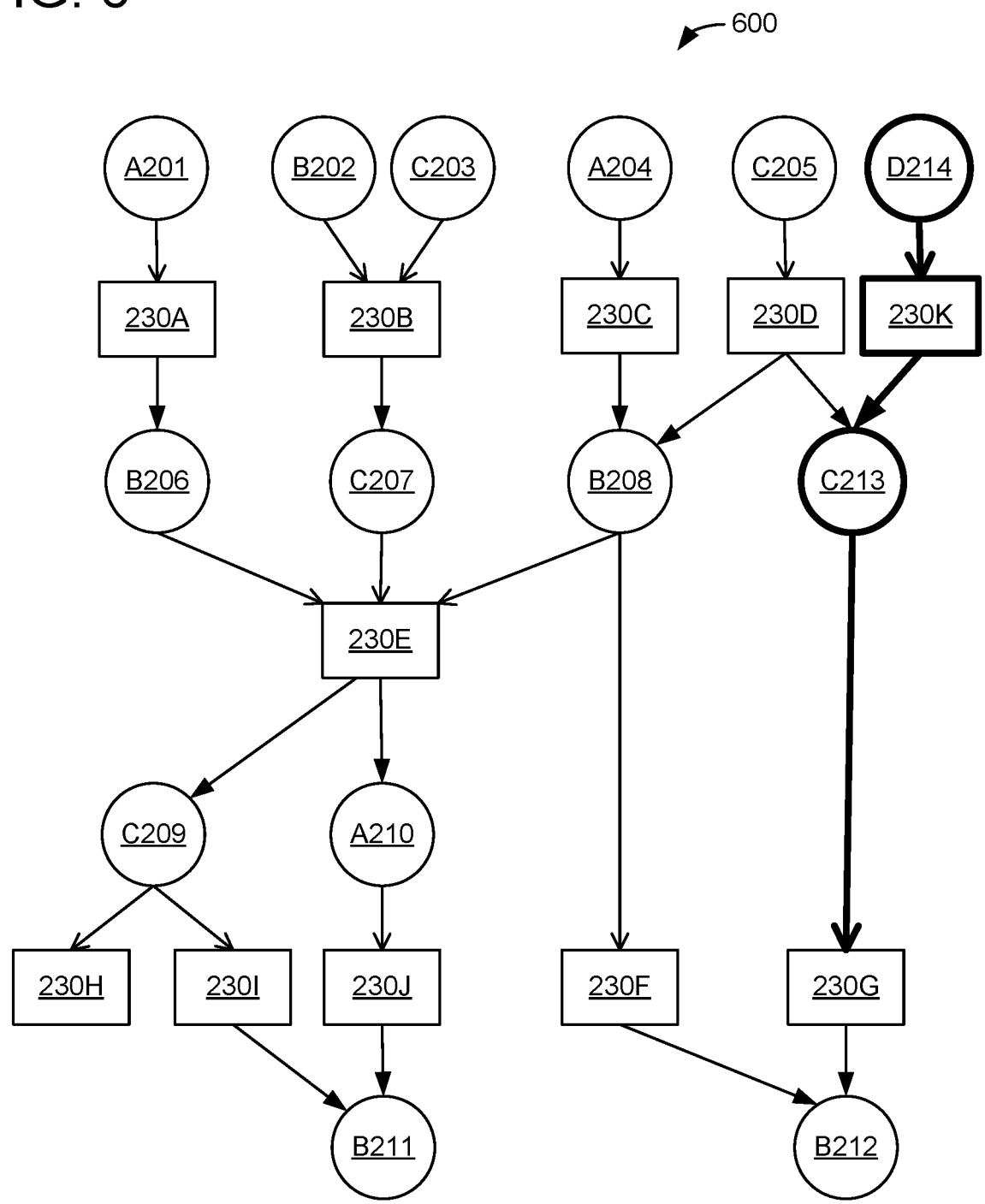
FIG. 6 shows an updated AI graph data structure resulting from updating the AI graph data structure of FIG. 2A to include additional function nodes and semantic entities as shown in FIGS. 5A-5C.

Although the example shown in FIGS. 5A-5B and in FIG. 6 shows updating the AI graph to include two new functions "getSensorLoc" and "getDirections," computer-analyzing documentation to cross-link APIs may include adding further functions, e.g., from further APIs. When there are more API functions to incorporate (e.g., when more function names were recognized while computer-analyzing the documentation of the plurality of APIs), method 100 may include returning to 102 to further computer-analyze API documentation. Such further analysis may result in identifying further functions (e.g., functions not previously recognized for an API, or functions from a new API not previously analyzed). Such further analysis may also result in identifying further API-specific input/output parameters for a function, e.g., in order to computer-identify one, two, or any other number of API-specific input/output parameters for the function. Accordingly, method 100 may include looping over computer analyzing API documentation at 102, updating the AI graph data structure at 103, and determining whether there are more API functions to incorporate at 104, so as to perform method 100 in a loop until a sufficient set of API functions are incorporated. In some examples, such looping may be performed until all API functions are exhaustively identified for the plurality of APIs. In other examples, such looping may be performed until a subset of API functions are identified, e.g., by looping until a particular number of API functions are identified, by looping until a particular set of semantic entities are available based on the identified API functions, and/or by looping until a particular set of target API functions are satisfied based on available semantic entities.

Figure 7:
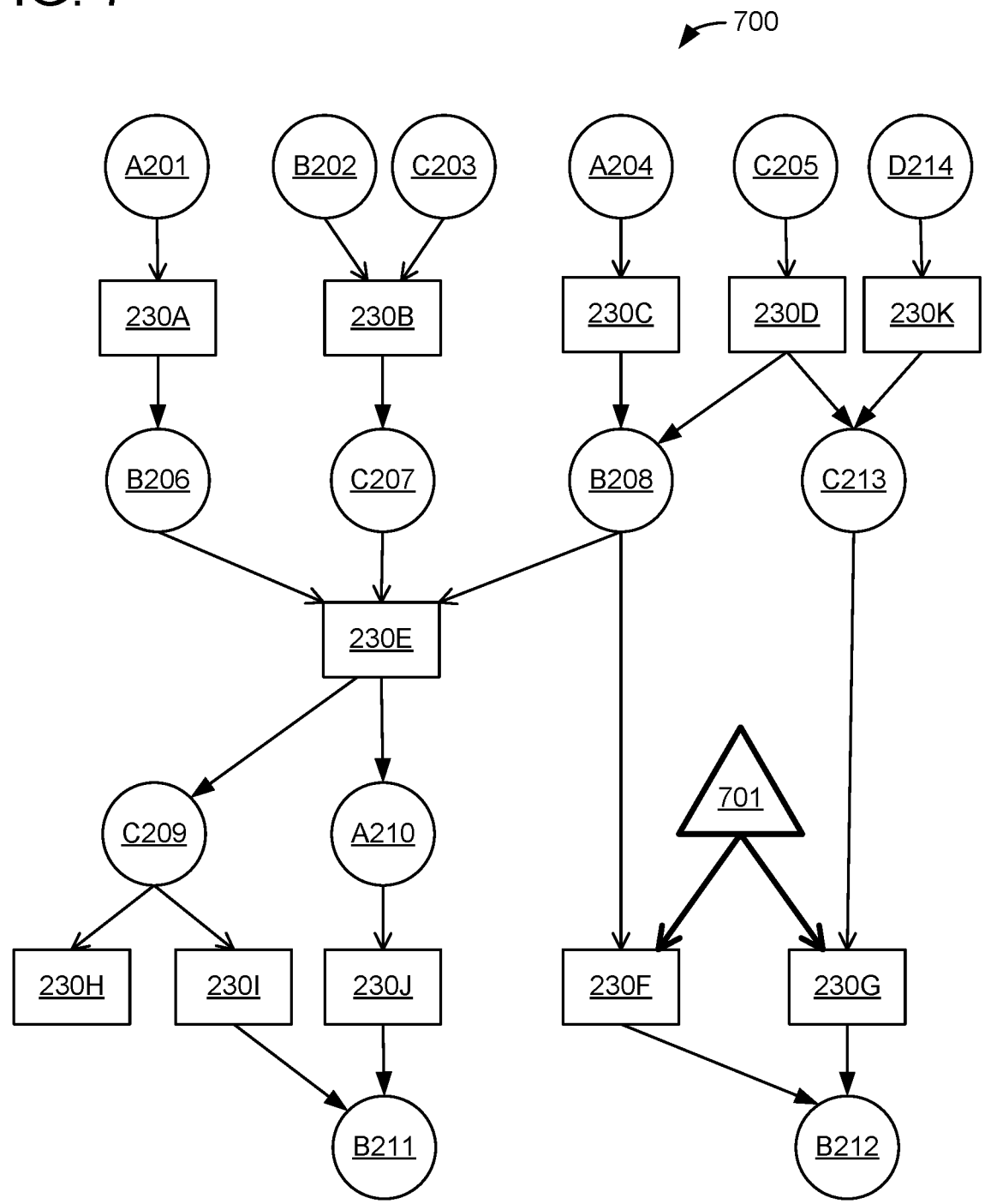
FIG. 7 shows an updated AI graph data structure resulting from updating the AI graph data structure of FIG. 6 to include a botlet.

In addition to function nodes representing functions made available by a plurality of APIs, the AI graph data structure may further include one or more botlet nodes representing botlets. For example, FIG. 7 shows an AI graph data structure 700 resulting from updating the AI graph data structure 600 of FIG. 6 to include a new botlet node 701.

Botlet nodes may be used to fill semantic "gaps" in the AI graph data structure or to make API-agnostic semantic entities available (e.g., as an alternative to making the API-agnostic semantic entities available based on upstream function nodes). Accordingly, adding a botlet node may include computer-recognizing an API-agnostic semantic entity including a semantic data socket without an incoming connection via an output adapter edge, and automatically updating the AI graph data structure to include a botlet node. Similar to output data sockets of function nodes, a botlet node may include a botlet output data socket configured to transmit a semantic data value having an API-agnostic semantic data type associated with the API-agnostic semantic entity, and a botlet output edge connecting the botlet output data socket to the semantic data socket of the API-agnostic semantic entity.

Botlets may be configured to provide API-agnostic semantic entities in any suitable manner, e.g., based on hand-written executable code configured to provide an API-agnostic semantic entity. Compared to writing full computer programs, it is believed that writing a plurality of botlets to fill in semantic gaps in an AI graph data structure is scalable, because while a new botlet may be defined to provide a new API-agnostic semantic entity, the resulting code may be re-used in each circumstance where the API-agnostic semantic entity is needed (e.g., by automatically configuring the botlet code to be executed in cooperation with botlet code of other botlets, and invocations of the plurality of APIs to execute functions provided by the plurality of APIs. Botlets may be configured to provide any suitable semantic entities, e.g., by supplying an indication of a user preference, supplying personal user data, supplying device data (e.g., using local APIs for sensors, such as local API 303 shown in FIG. 3), looking up facts (e.g., by communicatively coupling to a search engine service), and/or by transforming semantic data values associated with other semantic entities (e.g., to convert the data values to a different API-agnostic semantic data type).

A botlet may be configured to receive natural language input via a natural language user interface (e.g., when botlets are included in a computerized personal assistant such as computerized personal assistant 301 shown in FIG. 3). Accordingly, the botlet may be configured to output any appropriate API-agnostic semantic entities based on the received natural language input. Alternately or additionally, a botlet may be configured to take in one or more API-agnostic semantic entities and provide API-agnostic semantic entities based on such inputs (e.g., operating similarly to a function node).

In an example, botlet node 701 represents a disambiguation botlet configured to pose a disambiguation question via a natural language user interface. The disambiguation botlet is further configured to receive a response to the disambiguation question via the natural language user interface, and to operate a natural language response processing machine to output a computer-readable description of the response to the question. A botlet output data socket of botlet node 701 is configured to transmit the semantic data value based on the computer-readable description of the response.

When an API-agnostic semantic entity is unavailable, the AI graph data structure may be updated to include a failsafe botlet node connected to the API-agnostic semantic entity via a botlet output adapter edge. The failsafe botlet node may represent a botlet configured to execute a failsafe operation. The failsafe operation may be configured to attempt to provide the API-agnostic semantic entity with a default value (e.g., a 'null' value or 'zero' value of a semantic data type associated with the API-agnostic semantic entity). In some examples, a failsafe botlet may be configured to report a failure to a developer of an implementation of the AI graph data structure. Accordingly, in response to the failure, the developer may program a new botlet, annotate an API to clarify a possible approach to provide the API-agnostic semantic entity using one or more API functions, and/or manually tune the graph to ensure that the API-agnostic semantic entity is available.

An AI graph data structure according to the present disclosure may be useable to execute a function to perform a task based on a query (e.g., a query received via a natural language user interface). Accordingly, processing a query may include computer-recognizing a computer-readable description of an intent previously associated with the query (e.g., at a natural language query processing machine, such as natural language query processing machine 304 of computerized personal assistant 301 as shown in FIG. 3). Processing a query may further include selecting a target function node of the AI graph data based on the computer-readable description of the intent previously associated with the query.

In some examples, the selected target function node may represent an endpoint in a path of function nodes in the graph to be executed, e.g., a function that may be executed to satisfy the query by fulfilling the intent of the query. In other examples, the selected target function node may be a start point in a path of function nodes to explore, e.g., by selecting one or more downstream function nodes that may be parametrized based on semantic entities that may be provided by the function represented by the start point. By determining an endpoint or walking the graph in this manner, a dialog may be conducted in response to the query. For example, when a selected function node represents an endpoint, such a dialog can include posing disambiguating questions to get to the endpoint (e.g., by using a disambiguation botlet configured to provide API-agnostic semantic entities along the path to the endpoint).

Selecting a function node in the graph may be based on classifying one or more natural language features from API documentation in order to determine an associated user intent. For example, such classification may be performed using an NLP machine and an AI machine as described above, wherein the NLP machine and the AI machine are previously trained on labelled API documentation. The labelled API documentation may indicate an intent associated with one or more functions made available by an API, e.g., labelled documentation for a ride service API configured to reserve a vehicle for a user may indicate that a particular function is a good endpoint for a "scheduling a ride" intent.

The previously trained NLP machine and AI machine may be able to robustly determine user intents for a variety of different API functions even for APIs which were not included in a training data set of labelled API documentation, e.g., based on natural language similarities among API documentation for different APIs. For example, documentation for a second ride service API may use similar natural language in a description of a function for scheduling a ride, and the NLP machine and AI machine may recognize such similarity in order to classify the function as being associated with the "scheduling a ride" intent. In addition to the NLP machine and AI machine described above, recognizing an association between queries and functions may employ any suitable machine learning technique, for example, unsupervised learning techniques such as nearest neighbor search, or semi-supervised learning techniques such as zero shot learning or few shot learning.

Figure 8:
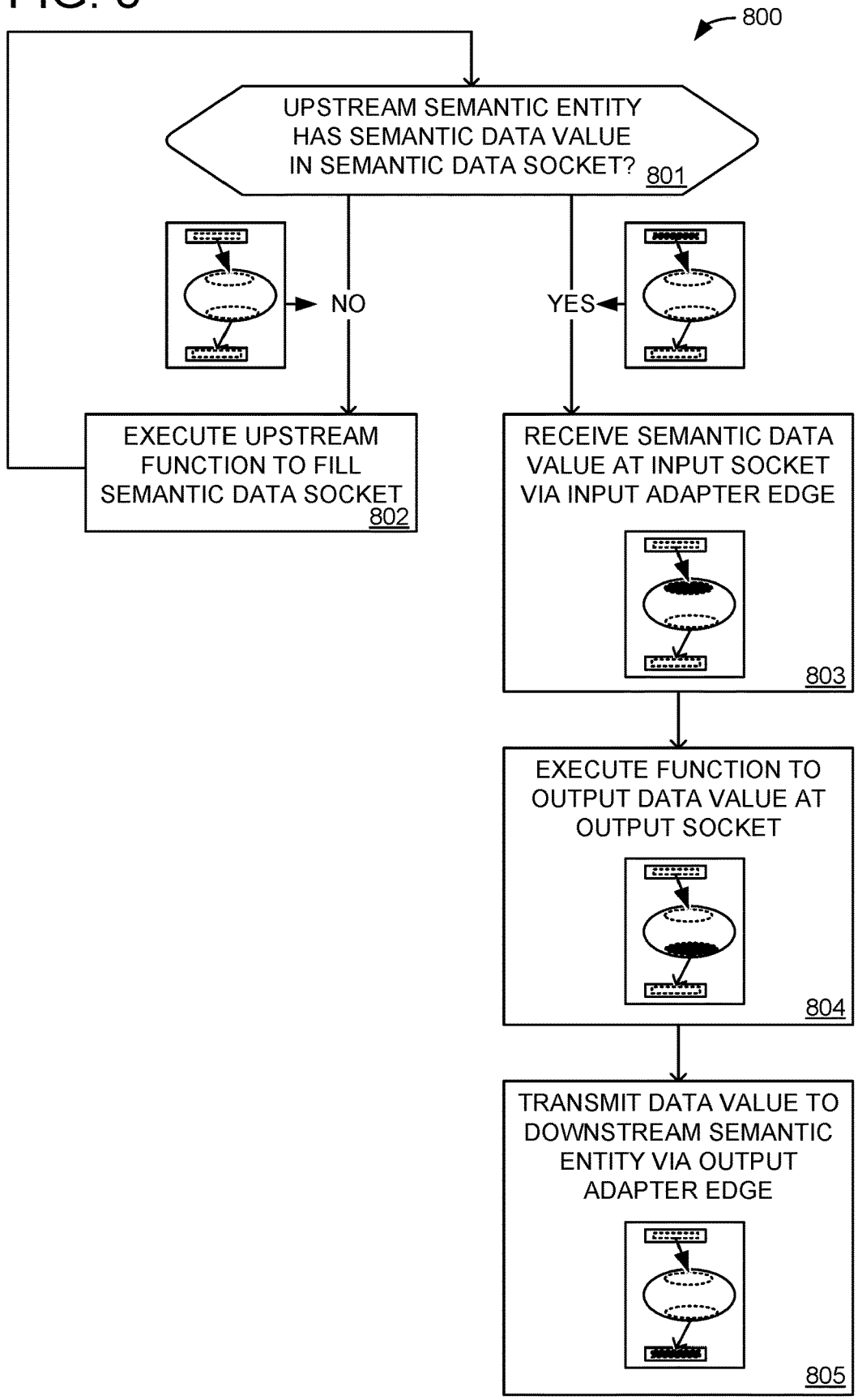
FIG. 8 shows a method of automatically configuring a plurality of cross-linked APIs to automatically execute a function represented by a function node in an AI graph data structure.

After selecting a target function to be executed, method 100 may further include executing the target function. Accordingly, FIG. 8 shows an exemplary method 800 for executing a function represented by a target function node. In some examples, the AI graph data structure may be used to perform a plurality of tasks by selecting a plurality of target functions and executing each of the target functions. Accordingly, each of the target functions may be executed according to method 800. In some examples, selecting a target function further includes selecting a path through the data structure including one or more additional function nodes representing additional functions to be executed, and executing each of the additional functions. In some examples, executing a plurality of functions based on the AI graph data structure (e.g., executing a plurality of selected target functions, and/or executing functions represented by function nodes in a path through the graph data structure) may include executing a first one of the plurality of functions and then executing a second one of the plurality of functions (e.g., executing the functions sequentially). In some examples, executing the plurality of functions may include executing two or more of the plurality of functions substantially in parallel (e.g., executing the functions concurrently).

At 801, method 800 includes determining if an upstream API-agnostic semantic entity connected to the target function node has a semantic data value in its semantic data socket, e.g., so that the target function may be parametrized with an API-specific input parameter based on the semantic data value.

At 802, if the upstream API-agnostic semantic entity does not have a semantic data value in its semantic data socket, method 800 includes executing an upstream function having an output data socket connected via an output adapter edge to the semantic data socket, in order to fill the semantic data socket. In some examples, method 800 may be performed recursively in order to execute further upstream functions.

At 803, if the upstream API-agnostic semantic entity does have a semantic data value in its semantic data socket, method 800 includes receiving the semantic data value at an input socket of the target function node, via an input adapter edge connecting the semantic data socket to the input socket.

At 804, method 800 includes executing the target function to output a data value at the output socket of the target function node. Accordingly, the target function may be parametrized with an API-specific input parameter based on the semantic data value received at the input socket. As such, the data value output at the output socket may depend on the semantic data value provided by the API-agnostic semantic entity. In this manner, the AI graph data structure may represent possible control flow and/or data flow using functions made available by the plurality of APIs, e.g., by representing each possible path along which data may flow as a path in the AI graph data structure including input adapter edges, function nodes, semantic entities, and output adapter edges.

At 805, method 800 includes transmitting the data value output by the target function to a downstream API-agnostic semantic entity via an output adapter edge connecting an output socket of the target function to a semantic data socket of the downstream API-agnostic semantic entity. Accordingly, by filling the semantic data socket with a semantic data value based on the data value output by the target function, it may be possible to execute further downstream functions, by parametrizing such functions with API-specific input parameters based on the semantic data value at the downstream API-agnostic semantic entity.

Figure 9A:
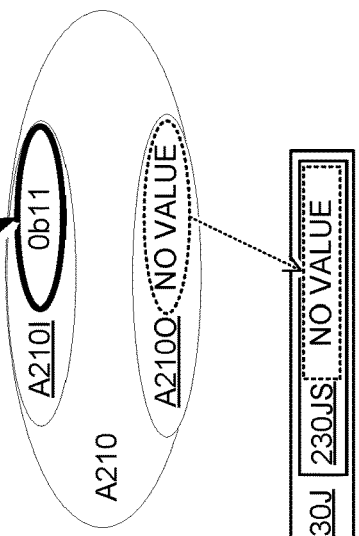
FIGS. 9A-9E show an exemplary data flow for automatically executing a function represented by a function node in an AI graph data structure.
Figure 9B:
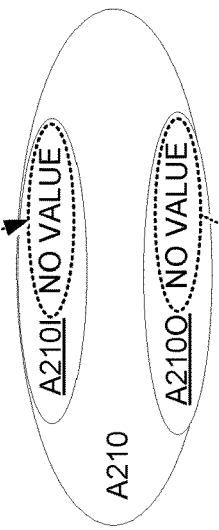

FIGS. 9A-9E show the dataflow depicted in FIG. 8 in more detail with regard to data flowing from a first API-agnostic semantic entity 230E to fill a semantic data socket 230JS of a second API-agnostic semantic entity 230. In FIG. 9A, API-agnostic semantic entity 230E has not yet received any value in semantic data socket 230ES. In FIG. 9B, a semantic data value "3.0" is received at a semantic data socket 230ES of first API-agnostic semantic entity 230E. Accordingly, the semantic data value may be transmitted via an input adapter edge to an input data socket A2101 of function node A210.

Figure 9C:
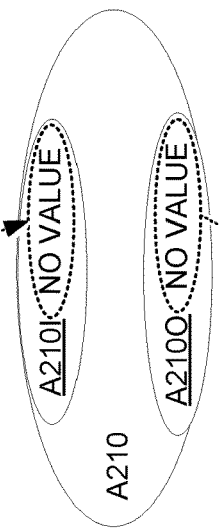

In FIG. 9C, a function "A210" represented by function node A210 is parametrized with an API-specific input parameter "Ob11" based on the semantic data value received at input data socket A2101. In the depicted example, an API-specific input data type of the API-specific input parameter differs from an API-agnostic semantic data type of the API-agnostic semantic entity 230E, e.g., API-agnostic semantic entity is associated with floating point data such as "3.0" whereas function "A210" has an API-specific input parameter comprising binary data. Accordingly, parametrizing function "A210" based on the semantic data value "3.0" may include converting the semantic data value to an input data value of the API-specific input data type, e.g., by rounding the floating point number "3.0" to the integer number "3" and by representing the integer number "3" as an unsigned binary number "Ob1."

Figure 9D:
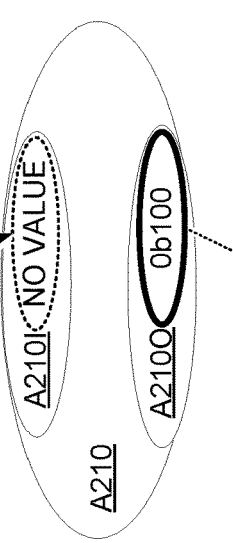

In FIG. 9D, the function "A210" is executed to output a data value "Ob100" at output data socket A2100 based on the input data value. The output data value may be derived from the input data value based on any suitable logic (e.g., as defined for function "A210" by API A). In an example, the output data value "Ob100" may be derived from the input data value "Ob11" based on a simple increment operation for unsigned binary numbers.

Figure 9E:
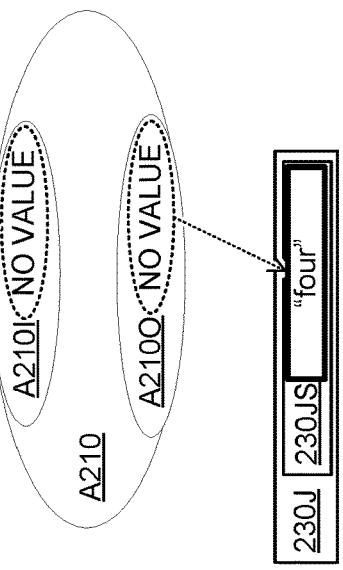

In FIG. 9E, the output data value "Ob100" is transmitted to a semantic data socket 230JS of a downstream API-agnostic semantic entity 230J. Accordingly, a semantic data value "four" is received at semantic data socket 230JS. The semantic data value may have an API-agnostic semantic data type differing from the API-specific output data type of the output data value, e.g., as depicted in FIG. 9E, the semantic data value is a string value comprising the numeral word "four," based on the binary representation of the unsigned number four encoded in the output data value "Ob100."

In some examples, executing a target function can include executing a plurality of functions represented by function nodes forming a path in the AI graph data structure terminating at the target function. "Path" may be used herein to refer to an ordered sequence of function nodes, semantic entities, input adapter edges, and/or output adapter edges. "Path" may additionally be used herein to refer to a sub-graph of an AI graph data structure, e.g., a sub-graph including a target function node and all of its upstream semantic entities, as well as upstream function nodes of each of the upstream semantic entities, and upstream semantic entities of each of the function nodes, etc.

Returning briefly to FIG. 8, if the upstream API-agnostic semantic entity is not available, executing the target function may include invoking one or more APIs to execute a plurality of other functions represented by function nodes in the path through the AI graph data structure to the target function, in order to execute the target function.

In some examples, an AI graph data structure may include a plurality of paths terminating at the target function node, e.g., the graph structure 700 shown in FIG. 7 includes three different paths to function node B212 (i.e., going through A204, A205, and D214). Accordingly, executing the target function includes selecting a path through the AI graph data structure ending at the target function node, in order to execute function nodes along the selected path. In some examples, selecting a path through the graph may enable constructing a dialog workflow based on the selected path (e.g., wherein disambiguating questions are posed by a disambiguation botlet configured to provide one or more semantic entities along the selected path).

Over time, the AI graph data structure may be configured according to a dialog policy. A dialog policy may allow constructing dialog workflows automatically for combinations of many different APIs, in order to achieve high-quality paths through the graph data structure to assist users with tasks based on queries. Various criteria may be applied to determine quality of a path, e.g., path length, a predicted degree of user satisfaction when the path is used to perform a task responsive to a query, number of disambiguating questions, monetary cost of utilizing a particular API (e.g., a cost associated with a ride service), and/or computational costs of using a particular API (e.g., a latency associated with a particular API function). The various criteria may be balanced by assigning a cost based on each criterion, e.g., in order to select a path having a minimal cost. For example, path quality may be based on a score that heavily weighs a predicted degree of user satisfaction (e.g., with a large cost when a user is likely to be dissatisfied by a result of executing functions represented by function nodes along the path) and also weighs a number of disambiguating questions (e.g., to avoid asking a disambiguating question when the predicted degree of user satisfaction would not be greatly affected by whether or not the disambiguating question is asked).

In some examples, selecting a path includes scoring a plurality of candidate paths with one or more graph theoretic measures (e.g., path length, network flow). In some examples, selecting a path includes generating one or more candidate paths with a graph theoretic algorithm (e.g., generating a shortest path that visits each of a plurality of function nodes based on an approximative solver for the Travelling Salesman Problem configured to find, with a high probability, such shortest paths).

In some examples, selecting a path includes operating a supervised classifier configured to rank paths in the AI graph data structure, e.g., by predicting a score for the paths and ranking the paths according to the scores. Accordingly, selecting a path may include generating a plurality of paths including all valid paths ending at the target function node, then, for each candidate path in the plurality of paths, operating a machine learning system (e.g., a machine learning classifier) previously trained to output, for a path, a score indicating a quality of the path (e.g., a score that weighs user satisfaction and number of disambiguating questions as described above), and selecting the highest ranked path based on the scores. Input to the machine learning system may include any suitable features of a path, e.g., length of a path, an encoding representing function nodes and/or semantic entities along a path, and/or a predicted result of executing one or more functions represented by function nodes along the path. The machine learning system may incorporate any suitable machine learning techniques, e.g., a supervised learning system previously trained based on labelled paths wherein a labelled path indicates, for a path, a score of the path assessed by one or more trainers (e.g., a score assessed by human software developers based on predicting and/or testing a result of executing functions of the plurality of APIs according to the path). The present disclosure is not intended to disclose new machine learning techniques, but instead, the methods performed herein may be implemented using any suitable arrangement of state of the art and/or future techniques.

In another example, selecting a path may include building a path by selecting a start point (e.g., an API-agnostic semantic entity or a function node) and then selecting a step in the path towards a downstream portion of the AI graph data structure (e.g., a step along an input adapter edge connecting from a selected API-agnostic semantic entity to a downstream function node), repeatedly selecting further downstream steps until the target function node is reached. Accordingly, building a path in this manner may effectively pick functions to execute one by one, by gradually building the path including function nodes representing the functions. Selecting each step in the path may be based on assessing a score of a selected step and/or a score of a path resulting from adding the selected step, e.g., a score output by a supervised machine learning system as described above with regard to scoring candidate paths.

In some examples, selecting a candidate path, or selecting each step in a path being built, may be based on a reinforcement learning system trained based on a reward signal. A reinforcement learning system may be configured to determine a score of a path based on a state of the path with regard to a possible action (e.g., extending the path along a selected step). The reinforcement learning system may be configured to learn an association between a possible action and an effect on future actions (e.g., by recognizing when extending the path along a selected step would decrease a score for all possible paths including the selected step that end at the selected function node relative to other possible steps, so as to avoid taking the selected step).

In order to adjust and improve the previously learned path selection policy, feedback may be gathered to assess results of the previously learned path selection policy. Accordingly, executing a selected function may further comprise receiving feedback indicating a quality of path selection, and adjusting the previously learned path selection policy based on the received feedback. Feedback may be explicitly gathered (e.g., in a dialog with a user), or inferred based on real-time usage of the AI graph data structure. Feedback may be gathered with regard to a single user or with regard to a whole population of users. Feedback may be gathered with regard to a subset of functions (e.g., functions made available by a particular API), e.g., to adjust the previously learned path selection policy with regard to scoring a path in which at least one function from the subset of functions is represented as a start point, end point, or function node along the path. Feedback may be used to adjust trainable parameters of any machine learning systems used in conjunction with the AI graph data structure (e.g., an NLP machine or AI machine as described above, a natural language query processing machine as described above with regard to FIG. 3, and/or a reinforcement learning system or a supervised classifier utilized in a path selection policy). Accordingly, by training any such machine learning systems with regard to feedback during real-time operation, the operation of such machine learning systems may be continually improved based on the feedback.

Adjusting the previously learned path selection policy based on feedback may include adjusting the policy to better accord with user preferences. For example, if a user is repeatedly presented with a disambiguating question asking them to choose between a first ride service and a second ride service, and if the user repeatedly chooses the first ride service, then updating the previously learned path selection policy may include adjusting the policy to avoid selecting paths that ask the disambiguating question, and to instead select paths that utilize the first ride service and not the second ride service.

Adjusting the previously learned path selection policy based on feedback may include adjusting the policy to avoid selecting paths that did not lead to successful execution of a selected API function, e.g., by automatically assessing positive feedback whenever the selected API function is eventually executed, and by automatically assessing negative feedback whenever the selected API function fails to execute (e.g., because an upstream function failed to execute, because executing functions along a selected path took too long resulting in a timeout, etc.). Similarly, adjusting the policy may be based on automatically assessing negative feedback if a user repeatedly issues a query (e.g., if it is believed that the user is repeatedly issuing the query due to responses to the query being inadequate).

In some examples, feedback used to adjust the previously learned path selection policy may include visual feedback from a user, e.g., after a user issues a query, the user may be visually presented with a graphical user interface (GUI) showing one or more decisions made due to the previously learned path selection policy. For example, such decisions could include a choice between candidate paths, and/or a choice of a next step to add when building a path. Accordingly, the user may be able to select, in the GUI, an option marking the one or more decisions as correct or incorrect (e.g., so as to adjust the path selection policy to more frequently make decisions that the user would label as correct). In some examples, adjusting the path selection policy may include adjusting a machine learning classifier configured to predict a degree of user satisfaction, so as to cause predictions of user satisfaction to more closely match actual user satisfaction.

In some examples, a previously learned path selection policy may be robustly applicable to a plurality of different APIs, even when such a previously learned path selection policy was only trained/adjusted with regard to a subset of the plurality of different APIs. For example, any machine learning models used in the previously learned path selection policy may be configured to utilize a shared representation of API features (e.g., natural language features, associations between intents and functions, and any other features described in the present disclosure). Accordingly, the machine learning models may be able to recognize similarity between features of different APIs in order to make similar decisions for similar API features. By utilizing a shared representation, the previously learned path selection policy may be able to robustly select high-quality paths even for a new API (e.g., an API for which the previously learned path selection policy has not yet been trained), by making decisions based on API features which may have been encountered in substantially similar form for a different, previously-encountered API.

In some cases, the AI graph data structure may be pruned to remove a low-quality path from the graph data structure. Such pruning may include removing, from the graph data structure, one or more botlets, API-agnostic semantic entities, function nodes, input adapter edges, and/or output adapter edges.

In some examples, pruning may be based on determining a subset of API-agnostic semantic entities which are necessary to execute a subset of API functions and removing all function nodes and/or botlets from the graph except for those which are upstream of the subset of API-agnostic semantic entities.

In some examples, pruning can be based on generating, for each candidate path of a plurality of possible paths through the AI graph data structure, a score for the path according to the path policy. Accordingly, such pruning may include removing a candidate path having a low score, e.g., by removing one or more botlets, API-agnostic semantic entities, function nodes, input adapter edges, and/or output adapter edges along the low-scoring candidate path. For example, such pruning may remove paths that were indicated to be low-quality based on user feedback, while retaining paths that were indicated to be high-quality based on the user feedback. Accordingly, a pruned graph may better reflect user and/or population goals and may facilitate improved efficiency of executing a function, by reducing a number of paths that need to be considered in order to select a path terminating at a function node representing the function.

In some embodiments, the methods and processes described herein (e.g., method 100 and method 800) may be tied to a computing system of one or more computing devices. In particular, such methods and processes may be implemented as a computer-application program or service, an application-programming interface (API), a library, and/or other computer-program product.

Figure 10:
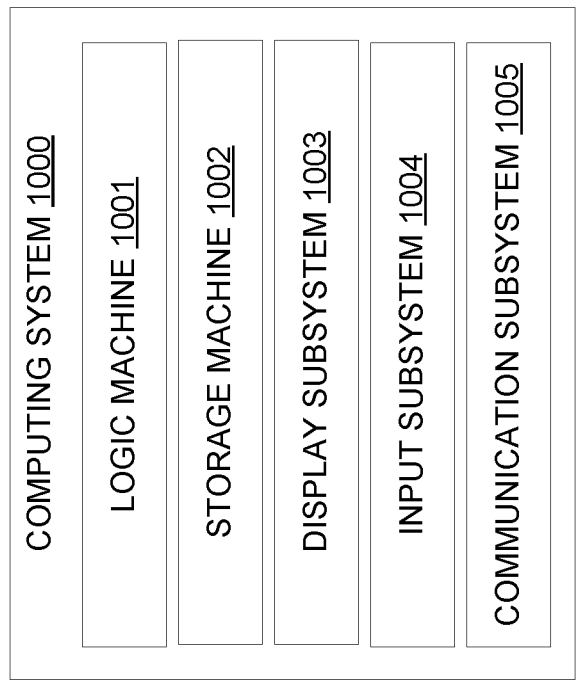
FIG. 10 shows an exemplary computing system.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices. Computerized personal assistant 301 is an example of computing system 1000.

Computing system 1000 includes a logic machine 1001 and a storage machine 1002. Computing system 1000 may optionally include a display subsystem 1003, input subsystem 1004, communication subsystem 1005, and/or other components not shown in FIG. 10.

Logic machine 1001 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1002 includes one or more physical devices configured to hold instructions executable by the logic machine to implement the methods and processes described herein. When such methods and processes are implemented, the state of storage machine 1002 may be transformed—e.g., to hold different data.

Storage machine 1002 may include removable and/or built-in devices. Storage machine 1002 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1002 may include volatile, nonvolatile, dynamic, static, read/write, read-only, random-access, sequential-access, location-addressable, file-addressable, and/or content-addressable devices.

It will be appreciated that storage machine 1002 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1001 and storage machine 1002 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Logic machine 1001 and storage machine 1002 may collectively serve as query machine 304 and graph machine 305 of FIG. 3.

The terms "module," "program," and "engine" may be used to describe an aspect of computing system 1000 implemented to perform a particular function. In some cases, a module, program, or engine may be instantiated via logic machine 1001 executing instructions held by storage machine 1002. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1003 may be used to present a visual representation of data held by storage machine 1002. This visual representation may take the form of a graphical user interface (GUI). As the herein described methods and processes change the data held by the storage machine, and thus transform the state of the storage machine, the state of display subsystem 1003 may likewise be transformed to visually represent changes in the underlying data. Display subsystem 1003 may include one or more display devices utilizing virtually any type of technology. Such display devices may be combined with logic machine 1001 and/or storage machine 1002 in a shared enclosure, or such display devices may be peripheral display devices.

When included, input subsystem 1004 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1005 may be configured to communicatively couple computing system 1000 with one or more other computing devices. Communication subsystem 1005 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

In an example, a method for automatically cross-linking a plurality of application programming interfaces (APIs) in an artificial-intelligence graph data structure comprises: maintaining an artificial intelligence (AI) graph data structure, wherein the AI graph data structure defines: a plurality of API-agnostic semantic entities, each API-agnostic semantic entity associated with an API-agnostic semantic data type and including a semantic data socket configured to hold a semantic data value having the API-agnostic semantic data type; a plurality of function nodes, each function node representing a function made available by an API and including an input data socket and an output data socket; a plurality of input adapter edges, each input adapter edge connecting a semantic data socket of an API-agnostic semantic entity to an input data socket of a function node; and a plurality of output adapter edges, each output adapter edge connecting an output data socket of a function node to a semantic data socket of an API-agnostic semantic entity. In this example or any other example, the method further comprises: for a target API of a plurality of APIs: computer analyzing documentation describing the target API with a natural language processing machine previously trained to identify: a new function made available by the target API, an upstream API-agnostic semantic entity corresponding to an API-specific input parameter of the function, and a downstream API-agnostic semantic entity corresponding to an API-specific output parameter of the function; and updating the AI graph data structure to include: a new function node representing the new function, an input adapter edge connecting a semantic data socket of the upstream API-agnostic semantic entity to an input data socket of the new function node, wherein the input data socket corresponds to the API-specific input parameter, and an output adapter edge connecting an output data socket of the function node to a semantic data socket of the downstream API-agnostic semantic entity, wherein the output data socket corresponds to the API-specific output parameter. In this example or any other example, the natural language processing machine is previously trained via supervised learning on a plurality of labelled APIs, wherein a labelled API includes documentation describing an API annotated by one or more trainers to include one or more semantic labels, wherein a semantic label indicates an API-specific parameter of the API and an API-agnostic semantic entity corresponding to the API-specific parameter. In this example or any other example, computer analyzing the documentation describing the target API with the natural language processing machine includes: computer-identifying a natural language feature indicating the new function made available by the target API; computer-identifying a natural language feature indicating an API-specific input parameter of the new function; computer-identifying the upstream API-agnostic semantic entity based on the natural language feature; computer-identifying a natural language feature indicating an API-specific output parameter of the new function; and computer-identifying the downstream API-agnostic semantic entity based on the natural language feature. In this example or any other example, the method further comprises: computer-recognizing an API-agnostic semantic entity including a semantic data socket without an incoming connection via an output adapter edge; automatically updating the AI graph data structure to include a botlet node, wherein the botlet node includes: a botlet output data socket configured to transmit a semantic data value having an API-agnostic semantic data type associated with the API-agnostic semantic entity, and a botlet output edge connecting the botlet output data socket to the semantic data socket of the API-agnostic semantic entity. In this example or any other example, the method further comprises: posing a disambiguation question via a natural language user interface; receiving a response to the disambiguation question via the natural language user interface; and operating a natural language response processing machine to output a computer-readable description of the response to the question; wherein the botlet output data socket is configured to transmit the semantic data value based on the computer-readable description of the response. In this example or any other example, the input data socket of the new function node is configured to receive an input data value for parametrizing the new function, the input data value having an API-specific input data type of an API-specific input parameter of the new function; and the input adapter edge between the semantic data socket of the upstream API-agnostic semantic entity and the input data socket of the new function node is configured to ensure compatibility between an API-agnostic semantic data type associated with the upstream API-agnostic semantic entity and the API-specific input data type of the API-specific input parameter. In this example or any other example, the output data socket of the new function node is configured to transmit an output data value of the new function, the output data value having an API-specific output data type of an API-specific output parameter of the new function; and the output adapter edge between the output data socket of the new function node and the semantic data socket of the downstream API-agnostic semantic entity is configured to ensure compatibility between the API-specific output data type of the API-specific output parameter and an API-agnostic semantic data type associated with the downstream API-agnostic semantic entity. In this example or any other example, documentation describing each different target API of the plurality of APIs is received from an API discovery service configured to track, on a computer network, a plurality of available APIs accessible via the computer network and to provide, for each available API, documentation describing the available API in a computer-readable format. In this example or any other example, the method further comprises: receiving a query; based on the query, selecting a target function node of the AI graph data structure; executing a target function represented by the target function node. In this example or any other example, the method further comprises: computer analyzing the query with a natural language query processing machine to computer-recognize a computer-readable description of an intent associated with the query, and selecting the target function node previously associated with the intent. In this example or any other example, executing the target function includes: selecting a path through the AI graph data structure ending at the target function node; and executing a plurality of other functions represented by other function nodes in the path through the AI graph data structure. In this example or any other example, the path through the AI graph data structure is a highest ranked candidate path based on a previously learned path selection policy, and wherein the previously learned path selection policy ranks a plurality of candidate paths ending at the target function node with a machine learning system previously trained to output, for each candidate path, a score indicating a quality of the path. In this example or any other example, the method further comprises: receiving feedback indicating a quality of path selection; and adjusting a previously learned path selection policy based on the received feedback. In this example or any other example, the method further comprises: pruning a low-quality path from the graph data structure by removing, from the graph data structure, one or more API-agnostic semantic entities, function nodes, input adapter edges, and/or output adapter edges.

In an example, a method for automatically cross-linking a plurality of application programming interfaces APIs comprises: for a first API of the plurality of APIs: computer-analyzing documentation describing the first API with a natural language processing (NLP) machine previously trained to identify natural language features associated with APIs, the NLP identifying a first function made available by the first API, and identifying a first natural language feature associated with an API-specific input parameter of the first function; and computer-recognizing, with an artificial intelligence (AI) machine previously trained to associate natural language features with API-agnostic semantic entities, an API-agnostic semantic entity associated with the natural language feature; for a second, different API of the plurality of APIs: computer analyzing documentation describing the second API with the NLP machine, the NLP machine identifying a second function made available by the second API, and identifying a second natural language feature associated with an API-specific output parameter of the second function; and computer-recognizing, with the AI machine, an association between the second natural language feature and the API-agnostic semantic entity identified for the first API. In this example or any other example, the method further comprises: providing an artificial-intelligence graph data structure representing the first function and the second function as cross-linked by the API-agnostic semantic entity, wherein the artificial-intelligence graph data structure is useable to: invoke the second API to execute the second function, to determine an output data value of the second function, the output data value having an API-specific output data type; update a semantic data socket of the API-agnostic semantic entity to hold a semantic data value having an API-agnostic semantic data type, wherein the semantic data value is based on the output data value; and invoke the first API to execute the first function, wherein the API-specific input parameter of the first function is parameterized with an input data value having an API-specific input data type, and wherein the input data value is based on the semantic data value. In this example or any other example, the API-specific input data type of the first function is different than the API-specific output data type of the second function. In this example or any other example, the natural language processing machine is previously trained via supervised learning on a plurality of labelled APIs, wherein a labelled API includes documentation describing an API annotated by one or more trainers to include one or more semantic labels, wherein a semantic label indicates an API-specific parameter of the API and an API-agnostic semantic entity corresponding to the API-specific parameter.

In an example, a computerized personal assistant comprises: a graph machine configured to access an AI graph data structure defining: a plurality of API-agnostic semantic entities, each API-agnostic semantic entity associated with an API-agnostic semantic data type and including a semantic data socket configured to hold a semantic data value having the API-agnostic semantic data type; a plurality of function nodes, each function node representing a function made available by an API and including an input data socket and an output data socket; a plurality of input adapter edges, each input adapter edge connecting a semantic data socket of an API-agnostic semantic entity to an input data socket of a function node; and a plurality of output adapter edges, each output adapter edge connecting an output data socket of a function node to a semantic data socket of an API-agnostic semantic entity. In this example or any other example, the computerized personal assistant further comprises a query machine configured to: receive a query; operate a natural language query processing machine to computer-recognize a computer-readable description of an intent associated with the query; pass the computer-readable description of the intent to the graph machine. In this example or any other example, the graph machine is further configured to: select a target function node of the AI graph data structure based on the computer-readable description of the intent associated with the query; select a path through the AI graph data structure ending at the target function node; and invoke one or more APIs to execute a plurality of other functions represented by function nodes in the path to the target function and to execute the target function. In this example or any other example, the natural language processing machine is previously trained via supervised learning on a plurality of labelled APIs, wherein a labelled API includes documentation describing an API annotated by one or more trainers to include one or more semantic labels, wherein a semantic label indicates an API-specific parameter of the API and an API-agnostic semantic entity corresponding to the API-specific parameter.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for automatically cross-linking a plurality of application programming interfaces (APIs) in an artificial-intelligence graph data structure, the method comprising:
   maintaining an artificial intelligence (AI) graph data structure, wherein the AI graph data structure defines:
      a plurality of API-agnostic semantic entities, each API-agnostic semantic entity associated with an API-agnostic semantic data type and including a semantic data socket configured to hold a semantic data value having the API-agnostic semantic data type;
      a plurality of function nodes, each function node representing a function made available by an API and including an input data socket and an output data socket;
      a plurality of input adapter edges, each input adapter edge connecting a semantic data socket of an API-agnostic semantic entity to an input data socket of a function node; and
      a plurality of output adapter edges, each output adapter edge connecting an output data socket of a function node to a semantic data socket of an API-agnostic semantic entity; and
   for a target API of a plurality of APIs:
      computer-analyzing documentation describing the target API with a natural language processing machine previously trained to identify:
         a new function made available by the target API,
         an upstream API-agnostic semantic entity corresponding to an API-specific input parameter of the function, and
         a downstream API-agnostic semantic entity corresponding to an API-specific output parameter of the function; and
      updating the AI graph data structure to include:
         a new function node representing the new function;
         an input adapter edge connecting a semantic data socket of the upstream API-agnostic semantic entity to an input data socket of the new function node, wherein the input data socket corresponds to the API-specific input parameter; and
         an output adapter edge connecting an output data socket of the function node to a semantic data socket of the downstream API-agnostic semantic entity, wherein the output data socket corresponds to the API-specific output parameter.

2. The method of claim 1, wherein the natural language processing machine is previously trained via supervised learning on a plurality of labelled APIs, wherein a labelled API includes documentation describing an API annotated by one or more trainers to include one or more semantic labels, wherein a semantic label indicates an API-specific parameter of the API and an API-agnostic semantic entity corresponding to the API-specific parameter.

3. The method of claim 1, wherein computer-analyzing the documentation describing the target API with the natural language processing machine includes:
   computer-identifying a natural language feature indicating the new function made available by the target API;
   computer-identifying a natural language feature indicating an API-specific input parameter of the new function;
   computer-identifying the upstream API-agnostic semantic entity based on the natural language feature;
   computer-identifying a natural language feature indicating an API-specific output parameter of the new function; and
   computer-identifying the downstream API-agnostic semantic entity based on the natural language feature.

4. The method of claim 1, further comprising:
   computer-recognizing an API-agnostic semantic entity including a semantic data socket without an incoming connection via an output adapter edge;
   automatically updating the AI graph data structure to include a botlet node, wherein the botlet node includes:
      a botlet output data socket configured to transmit a semantic data value having an API-agnostic semantic data type associated with the API-agnostic semantic entity, and
      a botlet output edge connecting the botlet output data socket to the semantic data socket of the API-agnostic semantic entity.

5. The method of claim 4, further comprising:
   posing a disambiguation question via a natural language user interface;
   receiving a response to the disambiguation question via the natural language user interface; and
   operating a natural language response processing machine to output a computer-readable description of the response to the question;
   wherein the botlet output data socket is configured to transmit the semantic data value based on the computer-readable description of the response.

6. The method of claim 1, wherein:
   the input data socket of the new function node is configured to receive an input data value for parametrizing the new function, the input data value having an API-specific input data type of an API-specific input parameter of the new function; and
   the input adapter edge between the semantic data socket of the upstream API-agnostic semantic entity and the input data socket of the new function node is configured to ensure compatibility between an API-agnostic semantic data type associated with the upstream API-agnostic semantic entity and the API-specific input data type of the API-specific input parameter.

7. The method of claim 1, wherein:
   the output data socket of the new function node is configured to transmit an output data value of the new function, the output data value having an API-specific output data type of an API-specific output parameter of the new function; and
   the output adapter edge between the output data socket of the new function node and the semantic data socket of the downstream API-agnostic semantic entity is configured to ensure compatibility between the API-specific output data type of the API-specific output parameter and an API-agnostic semantic data type associated with the downstream API-agnostic semantic entity.

8. The method of claim 1, wherein documentation describing each different target API of the plurality of APIs is received from an API discovery service configured to track, on a computer network, a plurality of available APIs accessible via the computer network and to provide, for each available API, documentation describing the available API in a computer-readable format.

9. The method of claim 1, further comprising:
receiving a query;
based on the query, selecting a target function node of the AI graph data structure;
executing a target function represented by the target function node.

10. The method of claim 9, further comprising:
computer-analyzing the query with a natural language query processing machine to computer-recognize a computer-readable description of an intent associated with the query, and selecting the target function node previously associated with the intent.

11. The method of claim 9, wherein executing the target function includes:
selecting a path through the AI graph data structure ending at the target function node; and
executing a plurality of other functions represented by other function nodes in the path through the AI graph data structure.

12. The method of claim 11, wherein the path through the AI graph data structure is a highest ranked candidate path based on a previously learned path selection policy, and wherein the previously learned path selection policy ranks a plurality of candidate paths ending at the target function node with a machine learning system previously trained to output, for each candidate path, a score indicating a quality of the path.

13. The method of claim 11, further comprising:
receiving feedback indicating a quality of path selection; and
adjusting a previously learned path selection policy based on the received feedback.

14. The method of claim 1, further comprising pruning a low-quality path from the graph data structure by removing, from the graph data structure, one or more API-agnostic semantic entities, function nodes, input adapter edges, and/or output adapter edges.

15. A method for automatically cross-linking a plurality of application programming interfaces APIs, the method comprising:
for a first API of the plurality of APIs:
computer-analyzing documentation describing the first API with a natural language processing (NLP) machine previously trained to identify natural language features associated with APIs, the NLP identifying a first function made available by the first API, and identifying a first natural language feature associated with an API-specific input parameter of the first function; and
computer-recognizing, with an artificial intelligence (AI) machine previously trained to associate natural language features with API-agnostic semantic entities, an API-agnostic semantic entity associated with the natural language feature;
for a second, different API of the plurality of APIs:
computer-analyzing documentation describing the second API with the NLP machine, the NLP machine identifying a second function made available by the second API, and identifying a second natural language feature associated with an API-specific output parameter of the second function; and
computer-recognizing, with the AI machine, an association between the second natural language feature and the API-agnostic semantic entity identified for the first API.

16. The method of claim 15, further comprising providing an artificial-intelligence graph data structure representing the first function and the second function as cross-linked by the API-agnostic semantic entity, wherein the artificial-intelligence graph data structure is useable to:
invoke the second API to execute the second function, to determine an output data value of the second function, the output data value having an API-specific output data type;
update a semantic data socket of the API-agnostic semantic entity to hold a semantic data value having an API-agnostic semantic data type, wherein the semantic data value is based on the output data value; and
invoke the first API to execute the first function, wherein the API-specific input parameter of the first function is parameterized with an input data value having an API-specific input data type, and wherein the input data value is based on the semantic data value.

17. The method of claim 15, wherein the API-specific input data type of the first function is different than the API-specific output data type of the second function.

18. The method of claim 15, wherein the natural language processing machine is previously trained via supervised learning on a plurality of labelled APIs, wherein a labelled API includes documentation describing an API annotated by one or more trainers to include one or more semantic labels, wherein a semantic label indicates an API-specific parameter of the API and an API-agnostic semantic entity corresponding to the API-specific parameter.

19. A computerized personal assistant, comprising:
a graph machine configured to access an AI graph data structure defining:
a plurality of API-agnostic semantic entities, each API-agnostic semantic entity associated with an API-agnostic semantic data type and including a semantic data socket configured to hold a semantic data value having the API-agnostic semantic data type;
a plurality of function nodes, each function node representing a function made available by an API and including an input data socket and an output data socket;
a plurality of input adapter edges, each input adapter edge connecting a semantic data socket of an API-agnostic semantic entity to an input data socket of a function node; and
a plurality of output adapter edges, each output adapter edge connecting an output data socket of a function node to a semantic data socket of an API-agnostic semantic entity; and
a query machine configured to:
receive a query;
operate a natural language query processing machine to computer-recognize a computer-readable description of an intent associated with the query;
pass the computer-readable description of the intent to the graph machine;

wherein the graph machine is further configured to:
   select a target function node of the AI graph data structure based on the computer-readable description of the intent associated with the query;
   select a path through the AI graph data structure ending at the target function node; and
   invoke one or more APIs to execute a plurality of other functions represented by function nodes in the path to the target function and to execute the target function.

20. The computerized personal assistant of claim 19, wherein the natural language processing machine is previously trained via supervised learning on a plurality of labelled APIs, wherein a labelled API includes documentation describing an API annotated by one or more trainers to include one or more semantic labels, wherein a semantic label indicates an API-specific parameter of the API and an API-agnostic semantic entity corresponding to the API-specific parameter.

* * * * *